United States Patent
Miyagi et al.

(10) Patent No.: US 12,003,204 B2
(45) Date of Patent: Jun. 4, 2024

(54) DRIVER DEVICE FOR A STEPPING MOTOR

(71) Applicant: ROHM CO., LTD., Kyoto (JP)

(72) Inventors: Ryota Miyagi, Kyoto (JP); Hiroki Hashimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 107 days.

(21) Appl. No.: 17/913,361

(22) PCT Filed: Mar. 18, 2021

(86) PCT No.: PCT/JP2021/011140
§ 371 (c)(1),
(2) Date: Sep. 21, 2022

(87) PCT Pub. No.: WO2021/193364
PCT Pub. Date: Sep. 30, 2021

(65) Prior Publication Data
US 2023/0144831 A1 May 11, 2023

(30) Foreign Application Priority Data
Mar. 27, 2020 (JP) ................................ 2020-058203

(51) Int. Cl.
*H02P 8/12* (2006.01)
*H02P 8/34* (2006.01)

(52) U.S. Cl.
CPC . *H02P 8/12* (2013.01); *H02P 8/34* (2013.01)

(58) Field of Classification Search
CPC ...... H02P 8/00; H02P 8/02; H02P 8/04; H02P 8/06; H02P 8/10; H02P 8/12; H02P 8/14; H02P 8/18; H02P 8/24; H02P 8/28; H02P 8/34; H02P 8/40; H02P 7/04; H02P 6/182; H02P 6/28; H02P 3/00; H02P 25/066; H02P 8/22; H02P 8/30; H02P 8/42; H02K 41/03
See application file for complete search history.

(56) References Cited

FOREIGN PATENT DOCUMENTS

| | | | |
|---|---|---|---|
| CN | 105827164 A | * 8/2016 | ............... H02P 8/12 |
| JP | 2008022639 | 1/2008 | |
| JP | 2016208727 | 12/2016 | |
| JP | 2017156246 | 9/2017 | |

OTHER PUBLICATIONS

Hijikata, Hidetoshi, A Motor Current Control Device and Motor current control Method, Aug. 3, 2016, Clarivate Analytics, pp. 1-36. (Year: 2016).*
International Search Report in International Appln. No. PCT/JP2021/011140, dated May 25, 2021, 5 pages (with English Translation).

* cited by examiner

*Primary Examiner* — Antony M Paul
(74) *Attorney, Agent, or Firm* — Fish & Richardson P.C.

(57) ABSTRACT

A driver device supplies an output current to each coil in a stepping motor to rotate a rotor. After the polarity and magnitude of the output current for each coil have reached the target polarity and magnitude, during control for keeping the polarity and magnitude of the output current for each coil at the target polarity and magnitude, occurrence of a particular current waveform in the output current due to a back-electromotive force resulting from the rotation of the rotor is detected so that, if a particular current waveform is detected, a predetermined detection signal is transmitted to an external device.

15 Claims, 9 Drawing Sheets

DRIVER DEVICE FOR A STEPPING MOTOR

TECHNICAL FIELD

The present disclosure relates to driver devices for stepping motors.

BACKGROUND ART

Stepping motors have many uses as in sheet feeders in copiers and printers, image readers in scanners, and the like. A kind of driver device (motor driver) for stepping motors includes, for each of the motor coils of different phases in a stepping motor, a full-bridge circuit (H-bridge circuit) for feeding it with an output current (coil current). As the polarity and magnitude of the output current for the motor coil of each phase are varied stepwise, a rotor is rotated stepwise.

A driver device for stepping motors generally employs PWM constant-current control for the control of its output current. By PWM constant-current control, the output current value for the motor coil of each phase is kept around a target current value for a desired period during the rotation of a rotor.

LIST OF CITATIONS

Patent Literature

Patent Document 1: JP-A-2017-156246

SUMMARY OF THE DISCLOSURE

Problem to be Solved by the Disclosure

On the other hand, a counter-electromotive force appears in the motor coil of each phase as the rotor rotates. The counter-electromotive force may affect the output current of the driver device to cause it to increase above the target current value against PWM constant current control (this will be described in detail later). A capability of detecting such an event and coping with it in some way would be convenient.

The present disclosure is aimed at providing a driver device for a stepping motor that can cope with an event as mentioned above in a convenient way.

Means for Solving the Problem

According to one aspect of the present disclosure, a driver device for a stepping motor having a rotor and a coil includes: an output stage circuit configured to supply an output current to the coil by applying a voltage to the coil; a control circuit configured to control the output stage circuit based on a current setting signal for setting the target of the output current to be supplied to the coil and a current sense signal indicating the result of sensing of the output current; and a particular current waveform detector configured to detect occurrence of a particular current waveform in the waveform of the output current. The rotor rotates according to change of the output current based on change of the current setting signal. When the current setting signal is changed to require that, according to the current setting signal changed, the polarity of the output current be set to the target polarity and the magnitude of the output current be set to a target magnitude, the control circuit changes the output current to a current having the target polarity and the target magnitude according to the current setting signal changed and then, to approximate the magnitude of the output current to the target magnitude, the control circuit repeatedly performs a unit operation which is a sequence of a power supply mode operation and a decay mode operation. In the power supply mode operation, the output stage circuit is in a power supply state in which the output stage circuit supplies electric power to the coil to increase the magnitude of the output current and, in the decay mode operation, the output stage circuit is in a decay state in which the output stage circuit suspends supplying the electric power to decrease the magnitude of the output current. After the start of repetition of the unit operation, the particular current waveform detector detects, as the particular current waveform, a waveform with which the magnitude of the output current increases above the target magnitude and, on detecting occurrence of the particular current waveform, the particular current waveform detector transmits a predetermined detection signal to a device external to the driver device.

Advantageous Effects of the Disclosure

According to the present disclosure, it is possible to provide a driver device for a stepping motor that can cope with an event as mentioned above in a convenient way.

DESCRIPTION OF EMBODIMENTS

Hereinafter, examples of implementing the present disclosure will be described specifically with reference to the accompanying drawings. Among the diagrams referred to in the course, the same parts are identified by the same reference signs, and in principle no overlapping description of the same parts will be repeated. In the present description, for the sake of simplicity, symbols and reference signs referring to information, signals, physical quantities, elements, parts, and the like are occasionally used with omission or abbreviation of the names of the information, signals, physical quantities, elements, parts, and the like corresponding to those symbols and reference signs. For example, the particular current waveform detector described later and identified by the reference sign "160" (see FIG. 1) is sometimes referred to as the particular current waveform detector 160 and other times abbreviated to the detector 160, both referring to the same entity.

First, some of the terms used to describe embodiments of the present disclosure will be defined. "Ground" refers to a reference conductor at a reference potential of 0 V (zero volts), or to a potential of 0 V itself. A reference conductor is formed of an electrically conductive material such as metal. A potential of 0 V is occasionally referred to as a ground potential. In embodiments of the present disclosure, any voltage mentioned with no particular reference mentioned is a potential relative to the ground. "Level" denotes the level of a potential, and for any signal or voltage, "high level" has a higher potential than "low level". For any signal or voltage, its being at high level means its level being equal to high level, and its being at low level means its level being equal to low level. A level of a signal is occasionally referred to as a signal level, and a level of a voltage is occasionally referred to as a voltage level.

For any transistor configured as an FET (field-effect transistor), which can be a MOSFET, "on state" refers to a state where the drain-source channel of the transistor is conducting, and "off state" refers to a state where the drain-source channel of the transistor is not conducting (cut off). Similar definitions apply for any transistor that is not classified as an FET. Unless otherwise stated, any MOSFET can be understood to be an enhancement MOSFET. "MOSFET" is an abbreviation of "metal-oxide-semiconductor field-effect transistor". For any transistor, its being in the on or off state is occasionally expressed simply as its being on or off respectively.

Figure 1:
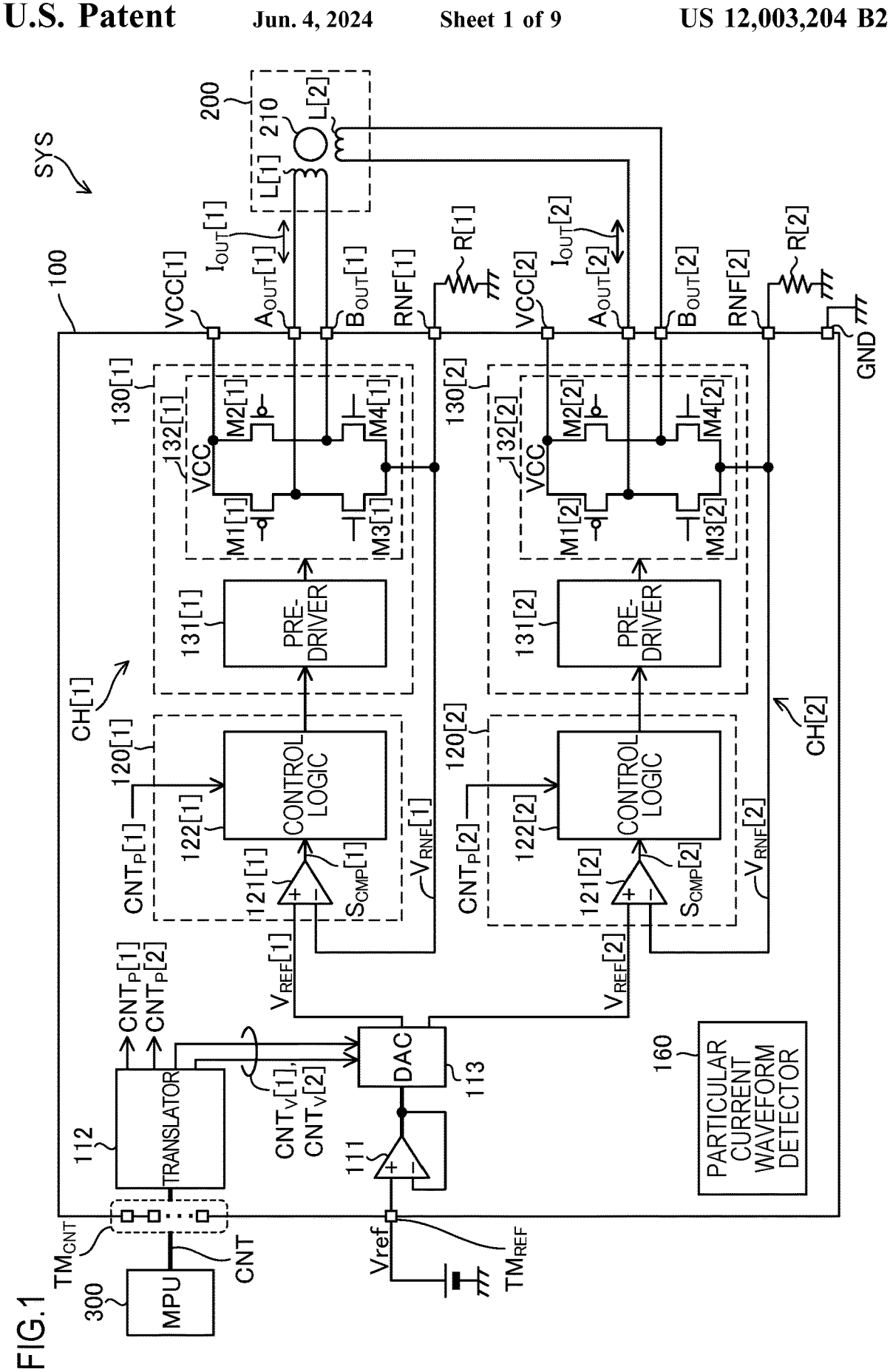
FIG. 1 is an overall configuration diagram of a motor driving system according to an embodiment of the present disclosure.

FIG. 1 shows an overall configuration of a motor driving system SYS according to an embodiment of the present disclosure. The motor driving system SYS includes a motor driver 100 as a driver device, a stepping motor 200, an MPU (microprocessor unit) 300, and current sensing resistors R[1] and R[2].

Figure 2:
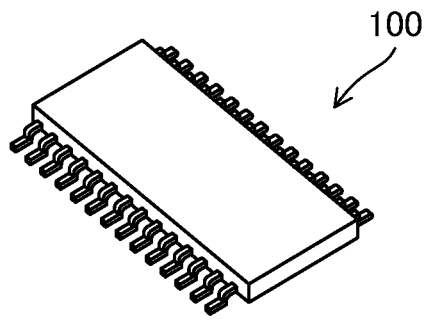
FIG. 2 is an exterior perspective view of a motor driver according to the embodiment of the present disclosure.

FIG. 2 is an exterior perspective view of the motor driver 100. The motor driver 100 is an electronic component (semiconductor device) formed by sealing a semiconductor integrated circuit in a package formed of resin. On the package of the motor driver 100, a plurality of external terminals are provided so as to be exposed. In the example of the configuration in FIG. 1, the plurality of external terminals provided in the motor driver 100 include power terminals VCC[1] and VCC[2], output terminals $A_{OUT}[1]$, $B_{OUT}[1]$, $A_{OUT}[2]$, and $B_{OUT}[2]$, resistor connection terminals RNF [1] and RNF[2], and a ground terminal GND, as well as a reference voltage input terminal $TM_{REF}$ and terminals serving as a control terminal group $TM_{CNT}$. Any other terminals may be included in the plurality of external terminals. Here, the number of external terminals on the motor driver 100 and the exterior view of the motor driver 100 shown in FIG. 2 are merely examples.

The stepping motor 200 includes motor coils (armature windings) for a plurality of phases and a rotor 210. The embodiment assumes that the stepping motor 200 is a two-phase stepping motor, and that, as the motor coils for two phases, motor coils L[1] and L[2] are provided in the stepping motor 200. Instead, as the stepping motor 200, a three-phase stepping motor with three motor coils or a five-phase stepping motor with five motor coils may also be used.

The MPU 300 controls the operation of the motor driver 100 by transmitting a control signal CNT to the motor driver 100. The motor driver 100 drives and controls the stepping motor 200 based on the control signal CNT. That is, the MPU 300 is an example of a processing device that controls the rotation of the rotor 210 by controlling the motor driver 100. The control signal CNT is fed to the control terminal group $TM_{CNT}$. The control signal CNT is composed of a plurality of control signals. Not all of the plurality of control signals may be fed from the MPU 300. That is, for example, of the plurality of control signals composing the control signal CNT, one or more control signals may be fixed at low level or high level by being pulled down or up.

The motor driver 100 includes an input buffer 111, a translator 112, a DAC 113, which is a digital-to-analog converter, a plurality of channel circuits, and a particular current waveform detector 160. The motor driver 100 includes as many channel circuits as the number of motor coils provided in the stepping motor 200. That is, if the stepping motor 200 has N motor coils, so as to correspond to them, a total of N channel circuits are provided in the motor driver 100 (where N is any integer of two or more). Here, where it is assumed that the stepping motor 200 includes two motor coils L[1] and L[2], a channel circuit CH[1] that corresponds to the motor coil L[1] and a channel circuit CH[2] that corresponds to the motor coil L[2] are provided in the motor driver 100. Also, although not specifically illustrated, an oscillator, a regulator, and different protection circuits are also provided in the motor driver 100.

In the motor driver 100, each channel circuit includes a control circuit and an output stage circuit. The control circuit and the output stage circuit provided in the channel circuit CH[i] are referred to as the control circuit 120[i] and the output stage circuit 130[i] respectively. Here, i is any integer; the control circuit 120[i] refers to, if i=1, the control circuit 120[1] and, if i=2, the control circuit 120[2]. The same applies to the output stage circuit 130[i] etc. In each channel circuit, the control circuit 120[i] includes a comparator 121[i] and a control logic 122[i]. In each channel circuit, the output stage circuit 130[i] includes a pre-driver 131[i] and a full-bridge circuit 132[i] (an H-bridge circuit).

A motor coil and a current sensing resistor are connected to each channel circuit.

The motor coil and the current sensing resistor that correspond to the channel circuit CH[i] are a motor coil L[i] and a current sensing resistor R[i]. Hereinafter, a circuit that includes a given channel circuit and a circuit including a motor coil and a current sensing resistor that correspond to the given channel circuit may be referred to as a channel. The channel composed of the channel circuit CH[1], the motor coil L[1], and the current sensing resistor R[1] is referred to as a first channel, and the channel composed of the channel circuit CH[2], the motor coil L[2], and the current sensing resistor R[2] is referred to as a second channel. The terminals $A_{OUT}[i]$, $B_{OUT}[i]$, RNF[i], and VCC[i] are the terminals that correspond to the i-th channel (the terminals that belong to the i-th channel). A common supply voltage VCC is fed from a power supply circuit (not shown) provided outside the motor driver 100 to the power terminals VCC[1] and VCC[2]. The supply voltage VCC is a positive direct-current voltage (for example, 24 V). The circuits in the motor driver 100 operate based on the supply voltage VCC. The ground terminal GND is connected to the ground.

The channel circuits CH[1] and CH[2] have the same circuit configuration, and the interconnection among the channel circuit, the motor coil, and the current sensing resistor is common to a plurality of channels. Thus, in the embodiment, the configuration of the i-th channel, voltages and currents in the i-th channel, etc. will be described using the symbol "i" representing any integer.

The output terminal $A_{OUT}[i]$ is connected to one terminal of the motor coil L[i], and the output terminal $B_{OUT}[i]$ is connected to the other terminal of the motor coil L[i]. A current passing between the output terminals $A_{OUT}[i]$ and $B_{OUT}[i]$ (thus, a current passing through the motor coil L[i]) is referred to as an output current $I_{OUT}[i]$. When the output current $I_{OUT}[i]$ passes from the output terminal $A_{OUT}[i]$ via the coil L[i] toward the output terminal $B_{OUT}[i]$, the polarity of the output current $I_{OUT}[i]$ is assumed to be positive and the polarity of the output current $I_{OUT}[i]$ opposite to it is assumed to be negative. As the polarities of the output currents $I_{OUT}[1]$ and $I_{OUT}[2]$ are changed or as the magnitudes and the polarities of the output currents $I_{OUT}[1]$ and $I_{OUT}[2]$ are changed, the rotor 210 rotates stepwise based on the magnetic force produced around the coils L[1] and L[2].

The current sensing resistor R[i] is provided outside the motor driver 100. The current sensing resistor R[i] is connected between the resistor connection terminal RNF[i] and the ground. The current sensing resistor R[i] senses the current passing through the motor coil L[i] and converts the sensed current into a voltage. The voltage at the resistor connection terminal RNF[i] is referred to as a detection voltage $V_{RNF}[i]$. The resistors R[1] and R[2] have the same (with some error permitted) resistance value (for example, 0.1Ω to 0.3Ω). The current sensing resistor R[i] constitutes a current sensor. The current sensor senses the output current $I_{OUT}[i]$ to generate a current sense signal indicating the result of sensing of the output current $I_{OUT}[i]$. During a period in which the output current $I_{OUT}[i]$ passes through the resistor R[i], the detection voltage $V_{RNF}[i]$ has a voltage value proportional to the output current $I_{OUT}[i]$; thus, it functions as the current sense signal. The current sensing resistor R[i] may be incorporated in the motor driver 100. In that case, the current sensor is incorporated in the motor driver 100.

The input buffer 111, the translator 112, and the DAC 113 are the circuits shared between the first and second channels.

The input buffer 111 is a voltage follower configured with an operational amplifier and outputs a reference voltage Vref, which is fed to the reference voltage input terminal $TM_{REF}$, to the DAC 113 with a low impedance. The reference voltage Vref is a positive direct-current voltage. As will be clear from the description given later, the reference voltage Vref determines the maximum value of the magnitude of the output currents $I_{OUT}[1]$ and $I_{OUT}[2]$.

The translator 112 is connected to the control terminal group $TM_{CNT}$ to receive the control signal CNT. The control signal CNT determines the driving scheme and the excitation mode of the motor 200 and the rotation direction of the rotor 210, and the translator 112, based on the control signal CNT, generates and outputs internal control signals $CNT_V[1]$, $CNT_V[2]$, $CNT_P[1]$, and $CNT_P[2]$. In each channel, the magnitude of the output current $I_{OUT}[i]$ is controlled in accordance with the internal control signal $CNT_V[i]$, and the polarity (output logic) of the output current $I_{OUT}[i]$ is controlled in accordance with the internal control signal $CNT_P[i]$.

The DAC 113, based on the reference voltage Vref fed through the input buffer 111, generates reference voltages $V_{REF}[1]$ and $V_{REF}[2]$ that are respectively given by $V_{REF}[1]=k_{DAC}[1] \times Vref$ and $V_{REF}[2]=k_{DAC}[2] \times Vref$ Here, the coefficient $k_{DAC}[i]$ is determined by the internal control signal $CNT_V[i]$. For example, the internal control signal $CNT_V[i]$ is a 2-bit digital signal, and the coefficient $k_{DAC}[i]$ selectively takes one of the values 0, ⅓, ⅔, and 1 in accordance with the internal control signal $CNT_V[i]$. Here, the DAC 113 may be configured with a 2-bit digital-to-analog converter. This, however, is not meant to limit the number of bits in the DAC 113.

The control circuit 120[1] is fed with, as signals for the first channel, the reference voltage $V_{REF}[1]$, the detection voltage $V_{RNF}[1]$, and the internal control signal $CNT_P[i]$. The control circuit 120[2] is fed with, as signals for the second channel, the reference voltage $V_{REF}[2]$, a detection voltage $V_{RNF}[2]$, and the internal control signal $CNT_P[2]$.

The control circuit 120[i], based on the reference voltage $V_{REF}[i]$, the detection voltage $V_{RNF}[i]$, and the internal control signal $CNT_P[i]$, controls the output stage circuit 130[i] so that the output current $I_{OUT}[i]$ has a magnitude in accordance with the reference voltage $V_{REF}[i]$ and the output current $I_{OUT}[i]$ has a polarity in accordance with the internal control signal $CNT_P[i]$.

Specifically, in the control circuit 120[i], the non-inverting input terminal of the comparator 121[i] is fed with the reference voltage $V_{REF}[i]$, and the inverting input terminal of the comparator 121[i] is fed with the detection voltage $V_{RNF}[i]$. The comparator 121[i] compares the voltage $V_{REF}[i]$ with the voltage $V_{RNF}[i]$ and outputs a comparison result signal Sc[i] indicating the result of comparison to the control logic 122[i]. The comparison result signal Sc[i] is at high level when the reference voltage $V_{REF}[i]$ is higher than the detection voltage $V_{RNF}[i]$ and is at low level when the reference voltage $V_{REF}[i]$ is lower than the detection voltage $V_{RNF}[i]$. When $V_{REF}[i]=V_{RNF}[1]$, the comparison result signal $S_{CMP}[i]$ is at high or low level.

The control logic 122[$i$] generates a motor driving signal that specifies the on/off states of the output transistors in the full-bridge circuit 132[$i$] based on the comparison result signal Sc[i] and the internal control signal $CNT_P$[i], and outputs the generated motor driving signal to the pre-driver 131[$i$]. The pre-driver 131[$i$], in accordance with the motor driving signal, turns on and off individually the plurality of output transistors constituting the full-bridge circuit 132[$i$]. Here, the control logic 122[$i$], based on the comparison result signal $S_{CMP}$[i] in the period during which the output current $I_{OUT}$[i] passes from the terminal RNF[i] via the resistor R[i] to the ground, generates the motor driving signal such that the detection voltage $V_{RNF}$ [i] during this period is close (ideally, substantially equal) to the reference voltage $V_{REF}$[i] and that the polarity of the output current $I_{OUT}$[i] is the same as the polarity specified by the internal control signal $CNT_P$[i].

In this way, the reference voltage $V_{REF}$[i] and the internal control signal $CNT_P$[i] constitute a current setting signal (in other words, a current command signal) that sets the target of the output current $I_{OUT}$[i] to be fed to the motor coil L[i]. With the detection voltage $V_{RNF}$[i] controlled so as to be close (ideally, substantially equal) to the reference voltage $V_{REF}$[i], the output current $I_{OUT}$[i] has a magnitude proportional to the reference voltage $V_{REF}$[i] (however, for some reason, the output current $I_{OUT}$[i] may have a magnitude contradicting the control; this will be described in detail later). That is, the target of the magnitude of the output current $I_{OUT}$[i] is set by the reference voltage $V_{REF}$[i]. In addition, the target of the polarity of the output current $I_{OUT}$[i] is set by the internal control signal $CNT_P$[i].

The full-bridge circuit 132[1] is composed of the output transistors M1[1] and M2[1] configured as P-channel MOSFETs and the output transistors M3[1] and M4[1] configured as N-channel MOSFETs. The full-bridge circuit 132[2] is composed of the output transistors M1[2] and M2[2] configured as P-channel MOSFETs and the output transistors M3[2] and M4[2] configured as N-channel MOSFETs. A P-channel MOSFET is accompanied by a parasitic diode of which the forward direction points from the drain to the source, and an N-channel MOSFET is accompanied by a parasitic diode of which the forward direction points from the source to the drain. In FIG. 1, the parasitic diodes are omitted from illustration.

In the full-bridge circuit 132[$i$], the sources of the output transistors M1[$i$] and M2[$i$] are both connected to the power terminal VCC[$i$], and the supply voltage VCC is applied to the respective sources of the output transistors M1[$i$] and M2[$i$]. In the full-bridge circuit 132[$i$], the drains of the output transistors M1[$i$] and M3[$i$] are both connected to the output terminal $A_{OUT}$[i], the drains of the output transistors M2[$i$] and M4[$i$] are both connected to the output terminal $B_{OUT}$[i], and the sources of the output transistors M3[$i$] and M4[$i$] are both connected to the resistor connection terminal RNF[i]. The pre-driver 131[$i$], by controlling the gate potentials of the output transistors M1[$i$] to M4[$i$] in accordance with the motor driving signal from the control logic 122[$i$], turns on an off the output transistors M1[$i$] to M4[$i$] individually.

While the above description deals with an example where the full-bridge circuit 132[$i$] is configured with P-channel and N-channel MOSFETs, the output transistors constituting the full-bridge circuit 132[$i$] may all be N-channel MOSFETs. In that case, the circuit is modified as necessary. The full-bridge circuit 132[$i$] may be configured with bipolar transistors instead of MOSFETs.

The motor driver 100 can drive the stepping motor 200 in one of a plurality of excitation modes in accordance with the control signal CNT. The plurality of excitation modes include a full step excitation mode in which the rotor 210 is rotated stepwise every electrical angle of 90°, a half step excitation mode in which the rotor 210 is rotated stepwise every electrical angle of 45°, and a quarter step excitation mode in which the rotor 210 is rotated stepwise every electrical angle of 22.5°.

Figure 3:
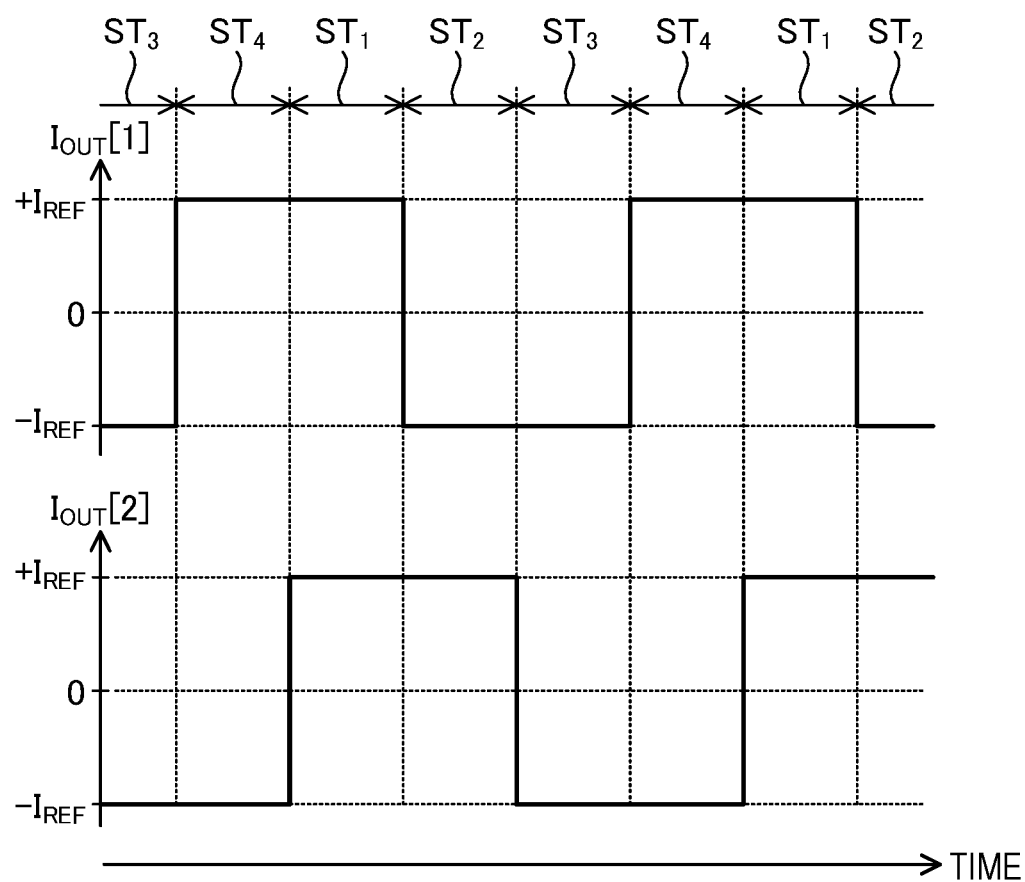
FIG. 3 is a diagram illustrating a full step excitation mode in connection with the embodiment of the present disclosure.

With reference to FIG. 3, the full step excitation mode will be described. In one example of implementation of the full step excitation mode, as shown in FIG. 3, states $ST_1$, $ST_2$, $ST_3$, and $ST_4$ occur in this order. Further, the sequence of states $ST_1$, $ST_2$, $ST_3$, and $ST_4$ occurs repeatedly. Thus, starting in state $ST_1$, states $ST_1$, $ST_2$, $ST_3$, and $ST_4$ occur in this order, and, after state $ST_4$, state $ST_1$, $ST_2$, $ST_3$, and $ST_4$ recur in this order.

The target value of the output current $I_{OUT}$[i] is referred to as a target current value. The target current value for the output current $I_{OUT}$[1] is represented by the symbol "$I_{TG}$[1]", and the target current value for the output current $I_{OUT}$[2] is represented by the symbol "$I_{TG}$[2]". The magnitude (absolute value) of the target current value $I_{TG}$[i] corresponds to the target of the magnitude of the output current $I_{OUT}$[i] (hereinafter referred to as the target magnitude) and is determined by the reference voltage $V_{REF}$[i]. The polarity of the target current value $I_{TG}$[i] corresponds to the target of the polarity of the output current $I_{OUT}$[i] (hereinafter referred to as the target polarity) and is determined by the internal control signal $CNT_P$[i]. Like the output current $I_{OUT}$[i], the target current value $I_{TG}$[i] has a polarity. If the resistance value of the resistor R[i] is represented by the symbol "R[i]", then $|I_{TG}[i]|=V_{REF}[i]/R[i]$. In the full step excitation mode, the magnitudes (absolute values) of the target current values $I_{TG}$[1] and $I_{TG}$[2] are both equal to a predetermined current value $I_{REF}$ and are constant ($I_{REF}>0$). Thus, in the full step excitation mode, the reference voltages $V_{REF}$[1] and $V_{REF}$[2] are fixed at a constant voltage (for example, fixed at a voltage equal to the reference voltage Vref). The current value $I_{REF}$ has a positive value proportional to the reference voltage Vref.

Specifically,
in state $ST_1$, ($I_{TG}$[1], $I_{TG}$[2])=($I_{REF}$, $I_{REF}$),
in state $ST_2$, ($I_{TG}$[1], $I_{TG}$[2])=(−$I_{REF}$, $I_{REF}$),
in state $ST_3$, ($I_{TG}$[1], $I_{TG}$[2])=(−$I_{REF}$, −$I_{REF}$), and
in state $ST_4$, ($I_{TG}$[1], $I_{TG}$[2])=($I_{REF}$, −$I_{REF}$).
Thus, the control circuits 120[1] and 120[2] control the output stage circuits 130[1] and 130[2] based on the reference voltages $V_{REF}$[1] and $V_{REF}$[2], the detection voltages $V_{RNF}$[1] and $V_{RNF}$[2], and the internal control signals $CNT_P$[1] and $CNT_P$[2] such that,
in state $ST_1$, ($I_{OUT}$[1], $I_{OUT}$[2])=($I_{REF}$, $I_{REF}$),
in state $ST_2$, ($I_{OUT}$[1], $I_{OUT}$[2])=(−$I_{REF}$, $I_{REF}$),
in state $ST_3$, ($I_{OUT}$[1], $I_{OUT}$[2])=(−$I_{REF}$, −$I_{REF}$), and
in state $ST_4$, ($I_{OUT}$[1], $I_{OUT}$[2])=($I_{REF}$, −$I_{REF}$).

Figure 4:
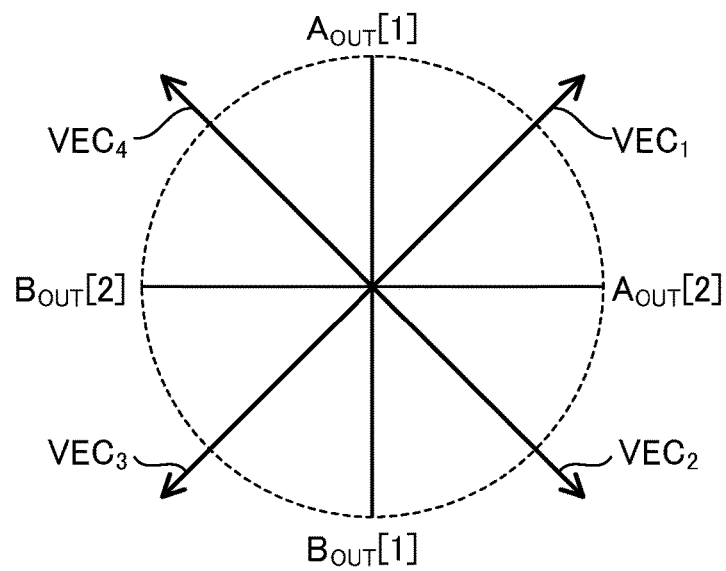
FIG. 4 is a diagram showing torque vectors in the full step excitation mode in connection with the embodiment of the present disclosure.

FIG. 4 is a diagram showing the torque vector of the stepping motor 200 in the full step excitation mode, expressed in degrees of electrical angle. Vectors $VEC_1$, $VEC_2$, $VEC_3$, and $VEC_4$ are the torque vectors in states $ST_1$, $ST_2$, $ST_3$, and $ST_4$ respectively. As the sequence of states $ST_1$, $ST_2$, $ST_3$, and $ST_4$ occurs repeatedly as shown in FIG. 3, the rotor 210 rotates stepwise every electrical angle of 90° in a first rotation direction; meanwhile the mechanical angle of the rotor 210 changes stepwise in the first rotation direction every angle corresponding to the amount of change in electrical angle. Reversely to what is shown in FIG. 3, it is possible to make states $ST_4$, $ST_3$, $ST_2$, and $ST_1$ occur in this order. In that case, the rotor 210 rotates stepwise in a second rotation direction opposite to the first rotation direction every electrical angle of 90°; meanwhile the mechanical angle of the rotor 210 changes stepwise in the second rotation direction every angle corresponding to the amount of change in electrical angle.

In the full step excitation mode, as described above, the target current value $I_{TG}[i]$ for each channel is switched between two current values "$I_{REF}$" and "$-I_{REF}$". Methods for controlling the output currents $I_{OUT}[1]$ and $I_{OUT}[2]$ in the half step and the quarter step excitation modes are, like that in the full step excitation mode, well known; thus no detailed description will be given. In the half step excitation mode, the target current value $I_{TG}[i]$ for each channel is switched among a total of three current values "$I_{REF}$", "0", and "$-I_{REF}$", and, in the quarter step excitation mode, the target current value $I_{TG}[i]$ for each channel is switched among a total of seven current values "$I_{REF}$", "(⅔) $I_{REF}$", "(⅓) $I_{REF}$", "0", "—(⅓) $I_{REF}$", "—(⅔) $I_{REF}$", and "$-I_{REF}$".

The motor driver 100, through PWM constant current control, keeps the value of the output current $I_{OUT}[i]$ around the target current value $I_{TG}[i]$. PWM is an abbreviation of "pulse width modulation".

Figure 5:
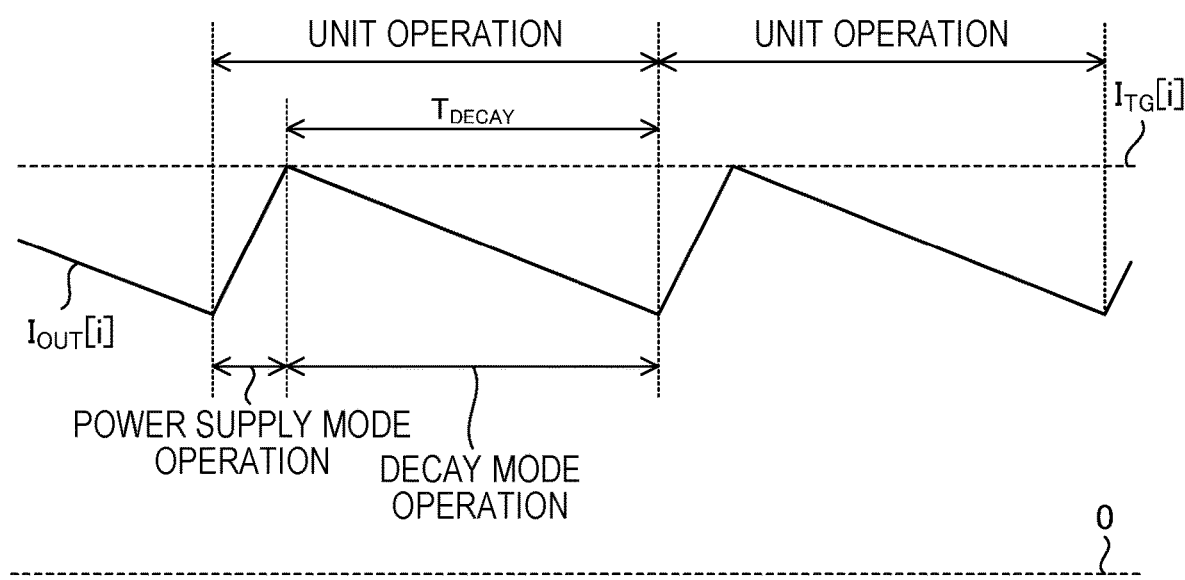
FIG. 5 is a diagram illustrating PWM constant-current control according to the embodiment of the present disclosure.

With reference to FIG. 5, PWM constant current control will now be described. To give a specific description, it is assumed that $I_{TG}[i]>0$ and that a positive output current $I_{OUT}[i]$ is passing.

In PWM constant current control, the control circuit 120[$i$] refers to the detection voltage $V_{RNF}[i]$ observed when the output current $I_{OUT}[i]$ is passing across the resistor R[i]. If $V_{REF}[i]>V_{RNF}[i]$, the control circuit 120[$i$] sets the operation mode of the i-th channel to a power supply mode until the detection voltage $V_{RNF}[i]$ reaches the reference voltage $V_{REF}[i]$ (that is, until the value of the output current $I_{OUT}[i]$ reaches the target current value $I_{TG}[i]$). When the detection voltage $V_{RNF}[i]$ reaches the reference voltage $V_{REF}[i]$ (that is, when the value of the output current $I_{OUT}[i]$ reaches the target current value $I_{TG}[i]$), the control circuit 120[$i$] switches the operation mode of the i-th channel from the power supply mode to a decay mode. After the switch to the decay mode, when a prescribed decay time $T_{DECAY}$ has passed, the operation mode of the i-th channel is switched from the decay mode back to the power supply mode.

The control circuit 120[$i$], in the period during which the operation mode of the i-th channel is the power supply mode, brings the output stage circuit 130[$i$] into a power supply state to perform a power supply mode operation and, in the period during which the operation mode of the i-th channel is the decay mode, brings the output stage circuit 130[$i$] into a decay state to perform a decay mode operation. The power supply state and the power supply mode operation are a state and an operation for increasing the magnitude of the output current $I_{OUT}[i]$, and the decay state and the decay mode operation are a state and an operation for making decay the magnitude of the output current $I_{OUT}[i]$. A sequence of one power supply mode operation and one decay mode operation performed one after the other is referred to as a unit operation. In PWM constant current control, through repetition of the unit operation, the magnitude of the output current $I_{OUT}[i]$ is kept around the target current value $I_{TG}[i]$ while being equal to or smaller than the absolute value $|I_{TG}[i]|$ (that is, equal to or smaller than the magnitude of the target current value $|I_{TG}[i]|$).

Figure 6:
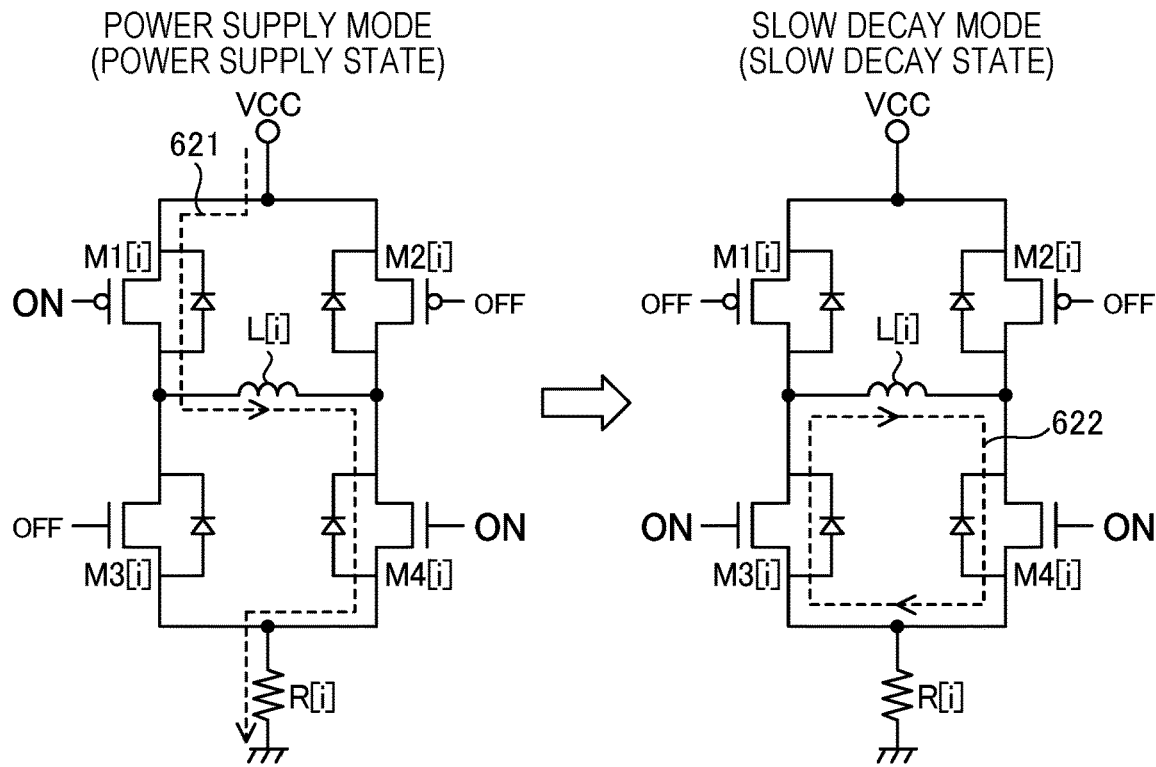
FIG. 6 shows a switch from a power supply mode to a slow power supply mode in connection with the embodiment of the present disclosure.
Figure 7:
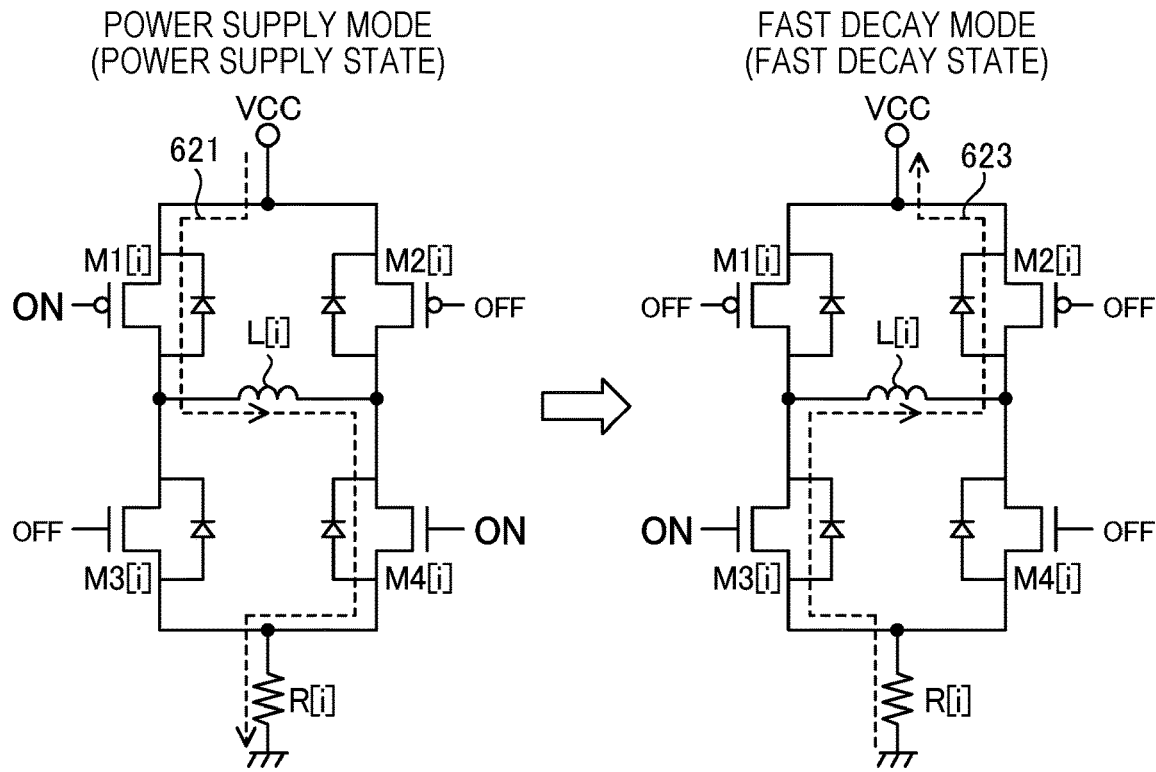
FIG. 7 shows a switch from the power supply mode to a fast power supply mode in connection with the embodiment of the present disclosure.

The decay mode has a slow decay mode and a fast decay mode. FIG. 6 shows a switch from the power supply mode to the slow decay mode. FIG. 7 shows a switch from the power supply mode to the fast decay mode. Note that, in FIGS. 6 and 7, it is assumed that $I_{TG}[i]>0$. With reference to FIGS. 6 and 7, the power supply mode, the slow decay mode, and the fast decay mode with the $I_{TG}[i]>0$ will be described.

In the i-th channel, in the power supply mode, the output stage circuit 130[$i$] is in the power supply state. When the output stage circuit 130[$i$] is in the power supply state, it means that the full-bridge circuit 132[$i$] is in the power supply state. An arrowed broken line 621 in FIGS. 6 and 7 indicates the flow of the output current $I_{OUT}[i]$ in the power supply state. When the output stage circuit 130[$i$] is in the power supply state, the output transistors M1[$i$] and M4[$i$] are on and in addition the output transistors M2[$i$] and M3[$i$] are off. Thus, in the power supply mode of the i-th channel, a positive output current $I_{OUT}[i]$ passes from the terminal fed with the supply voltage VCC via the output transistor M1[$i$], the motor coil L[i], the output transistor M4[$i$], and the resistor R[i] toward the ground, and the magnitude of the output current $I_{OUT}[i]$ increases with time. The operation achieved with the output stage circuit 130[$i$] in the power supply state corresponds to the power supply mode operation.

In the i-th channel, in the slow decay mode, the output stage circuit 130[$i$] is in a slow decay state, which is one kind of decay state. When the output stage circuit 130[$i$] is in the slow decay state, it means that the full-bridge circuit 132[$i$] is in the slow decay state. An arrowed broken line 622 in FIG. 6 indicates the flow of the output current $I_{OUT}[i]$ in the slow decay state. When the output stage circuit 130[$i$] is in the slow decay state, the output transistors M3 [i] and M4[$i$] are on and in addition the output transistors M1[$i$] and M2[$i$] are off. Thus, in the slow decay mode of the i-th channel, a positive output current IOUT[i] passes through a path via the output transistor M3[$i$], the motor coil L[i], and the output transistor M4[$i$], and the magnitude of the output current $I_{OUT}[i]$ decreases with time. The operation achieved with the output stage circuit 130[$i$] in the slow decay state is one kind of decay mode operation. In the slow decay mode of the i-th channel, the output transistor M3 [i] may be off.

In the i-th channel, in the fast decay mode, the output stage circuit 130[$i$] is in a fast decay state, which is another kind of decay state. When the output stage circuit 130[$i$] is in the fast decay state, it means that the full-bridge circuit 132[$i$] is in the fast decay state. An arrowed broken line 623 in FIG. 7 indicates the flow of the output current $I_{OUT}[i]$ in the fast decay state. When the output stage circuit 130[$i$] is in the fast decay state, the output transistor M3 [i] is on and in addition the output transistors M1[$i$], M2[$i$], and M4[$i$] are off. Thus, in the fast decay mode of the i-th channel, a positive output current $I_{OUT}[i]$ passes from the ground via the resistor R[i], the output transistor M3[$i$], the motor coil L[i], and the output transistor M2[$i$] (a parasitic diode in the output transistor M2[$i$]) toward the terminal fed with the supply voltage VCC, and the magnitude of the output current $I_{OUT}[i]$ decreases with time. The operation achieved with the output stage circuit 130[$i$] in the fast decay state is another kind of decay mode operation. Here, in the fast decay mode of the i-th channel, the output transistor M2[$i$] may be on, or the output transistor M3[$i$] may be off. In the fast decay mode of the i-th channel, the output transistors M1[$i$] to M4[$i$] may all be off. Although not specifically illustrated, on the occasion of a shift from the power supply state to the slow or fast decay state or a shift the other way around, a dead time is inserted as necessary to reliably prevent the series-connected output transistors from turning on simultaneously.

The slow and fast decay modes compare as follows: the decay rate of the output current $I_{OUT}[i]$ is lower in the slow decay mode than in the fast decay mode. As is well known, the slow and fast decay modes have their respective advantages and disadvantages. In the decay mode operation in each unit operation, a mixed decay mode operation may be performed where a period in which the output stage circuit $130[i]$ is in the slow decay state and a period in which the output stage circuit $130[i]$ is in the fast decay state are mixed. Based on an decay mode setting signal included in the control signal CNT, which operation to use as the decay mode operation is selected out of the slow decay mode operation with only the slow decay state, the fast decay mode with only the fast decay state, and the mixed decay mode operation. While the above description deals with the different mode operations with $I_{TG}[i]>0$, the same applies with $I_{TG}[i]<0$.

In any case, in the power supply mode operation in the i-th channel, the output stage circuit $130[i]$ is in the power supply state in which it feeds electric power to the motor coil $L[i]$ to increase the magnitude of the output current $I_{OUT}[i]$, and, in the decay mode operation in the i-th channel, the output stage circuit $130[i]$ is in the decay state in which it suspends supplying electric power (suspends the supply of electric power intended to increase the magnitude of the output current $I_{OUT}[i]$) to make decay the magnitude of the output current $I_{OUT}[i]$.

Figure 8A:
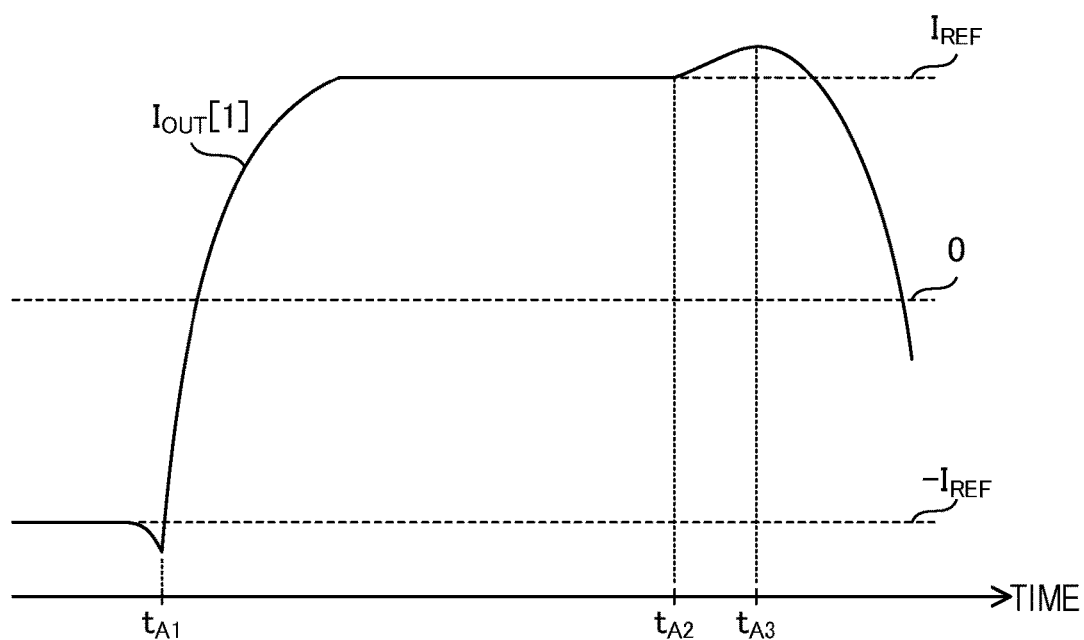
FIG. 8A is a diagram illustrating a current bump observed in the waveform of an output current to a motor coil in connection with the embodiment of the present disclosure.
Figure 8B:
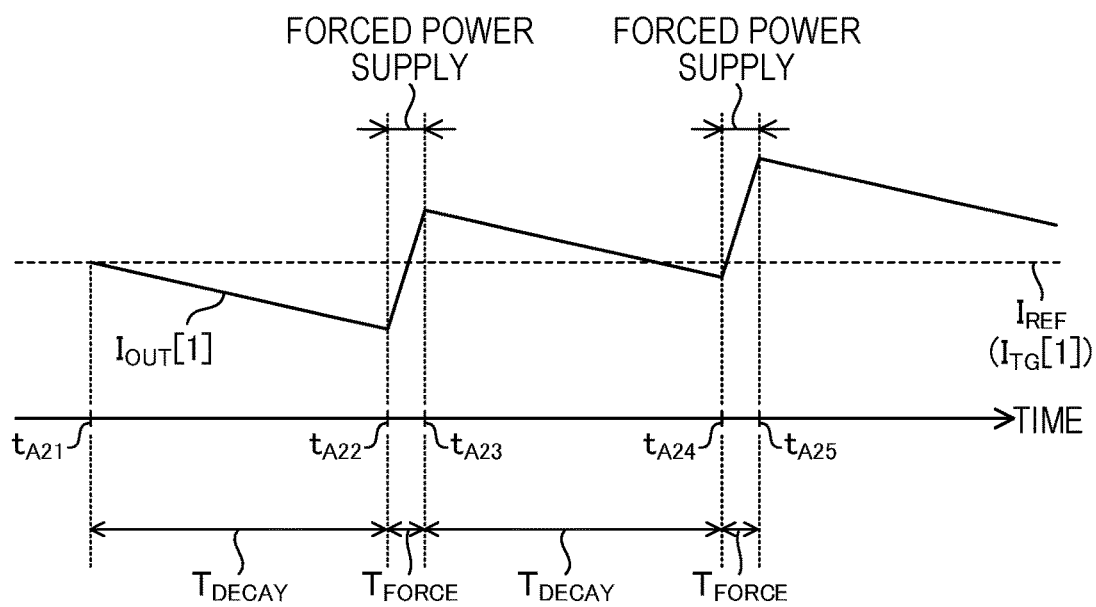
FIG. 8B is a diagram illustrating a current bump observed in the waveform of the output current to the motor coil in the embodiment of the present disclosure.

As described above, PWM constant current control is performed so that, in each channel, the magnitude of the output current $I_{OUT}[i]$ is kept around the target current value $I_{TG}[i]$ while being equal to or smaller than the absolute value $|I_{TG}[i]|$. However, the magnitude of the output current $I_{OUT}[i]$ may increase above the absolute value FIGS. 8A and 8B are schematic diagrams illustrating, with focus on the first channel, the cause for the magnitude of the output current $I_{OUT}[1]$ to exceed the absolute value $|I_{TG}[i]|$. In FIG. 8A, use of the full step excitation mode is assumed. Although use of the excitation mode in the motor driver 100 is optional, hereinafter, the embodiment assumes that the rotor 210 is driven to rotate in the full step excitation mode unless otherwise stated. As described above, in the full step excitation mode, when the rotor 210 is driven to rotate, a period in which $I_{TG}[1]=-I_{REF}$ and a period in which $I_{TG}[1]=I_{REF}$ alternate. FIG. 8A shows the waveform of the output current $I_{OUT}[1]$ chiefly in the period in which the $I_{TG}[1]=I_{REF}$.

At time point $t_{41}$, a shift takes place from $I_{TG}[1]=-I_{REF}$ to $I_{TG}[1]=I_{REF}$. Then, starting at time point $t_{41}$, the output current $I_{OUT}[1]$ starts to rise from a current value $(-I_{REF})$, which is the target current value $I_{TG}[1]$ before the shift, to the current value $I_{REF}$, which is the target current value $I_{TG}[1]$ after the shift, and after a while, the output current $I_{OUT}[1]$ reaches the current value $I_{REF}$. Then, in the period in which $I_{TG}[1]=I_{REF}$, through PWM constant current control achieved by repetition of the unit operation described above, basically, the output current $I_{OUT}[1]$ is kept around the target current value $I_{TG}[1]$ while being equal to or smaller than the absolute value $|I_{TG}[i]|$ (here, equal to or smaller than the $I_{REF}$). However, between time points $t_{42}$ and $t_{43}$ within a period in which $I_{TG}[1]=I_{REF}$, the output current $I_{OUT}[1]$ increases above the target current value $I_{TG}[1]$ (here, $I_{REF}$).

FIG. 8B shows the waveform of the output current $I_{OUT}[1]$ during part of the period between time points $t_{42}$ and $t_{43}$ (the period corresponding to three unit operations from $t_{421}$). In general, when the output transistors constituting the full-bridge circuit switch states between on and off, spike noise occurs. To suppress the effect of the spike noise through PWM constant current control, in each channel, after a shift from the decay state to the power supply state, the output stage circuit is forcibly brought into the power supply state for a predetermined forced power supply time $T_{FORCE}$ (minimum on time). Forcibly bringing the output stage circuit into the power supply state is referred to as forced power supply.

The operation connected with forced power supply will be described with focus on the i-th channel. During forced power supply in the i-th channel, the output stage circuit $130[i]$ is brought into the power supply state regardless of the detection voltage $V_{RNF}[i]$ (that is, regardless of the magnitude relationship between the reference voltage $V_{REF}[i]$ and the detection voltage $V_{RNF}[i]$) so that the power supply mode operation described above is performed. Then, in the i-th channel, after the power supply mode operation is started, when the forced power supply time $T_{FORCE}$ has passed, if the comparator $121[i]$ detects the magnitude of the output current $I_{OUT}[i]$ having become equal to or larger than the magnitude of the target current value $I_{TG}[i]$ (that is, the comparison result signal $S_{CMP}[i]$ being at low level), a switch is made from the power supply mode to the decay mode, and the decay mode operation is performed for a predetermined decay time $T_{DECAY}$. After the decay mode operation is performed for the decay time $T_{DECAY}$, the power supply mode operation starts again, and the power supply mode operation is performed at least for the forced power supply time $T_{FORCE}$. Although the forced power supply time $T_{FORCE}$ is suitably short, if the decrease in the current in the decay mode is small, during forced power supply, the magnitude of the output current $I_{OUT}[i]$ may rise above the magnitude of the target current value $I_{TG}[i]$.

In FIG. 8B with focus on the first channel with $I_{TG}[1]=I_{REF}$, forced power supply is performed between time points $t_{422}$ and $t_{423}$ and between time points $t_{424}$ and $t_{425}$, and during and after forced power supply, the output current $I_{OUT}[1]$ exceeds the target current value $I_{TG}[1]$ (here, $I_{REF}$). When the increase in the output current $I_{OUT}[1]$ under forced power supply is larger than the decrease in the output current $I_{OUT}[1]$ in the decay mode, an event (hereinafter called a current bump) occurs in which the magnitude of the output current $I_{OUT}[1]$ increases with time so far as to exceed the magnitude of the target current value $I_{TG}[1]$ (here, $I_{REF}$), and thus the desired current decay is no longer performed.

Figure 9:
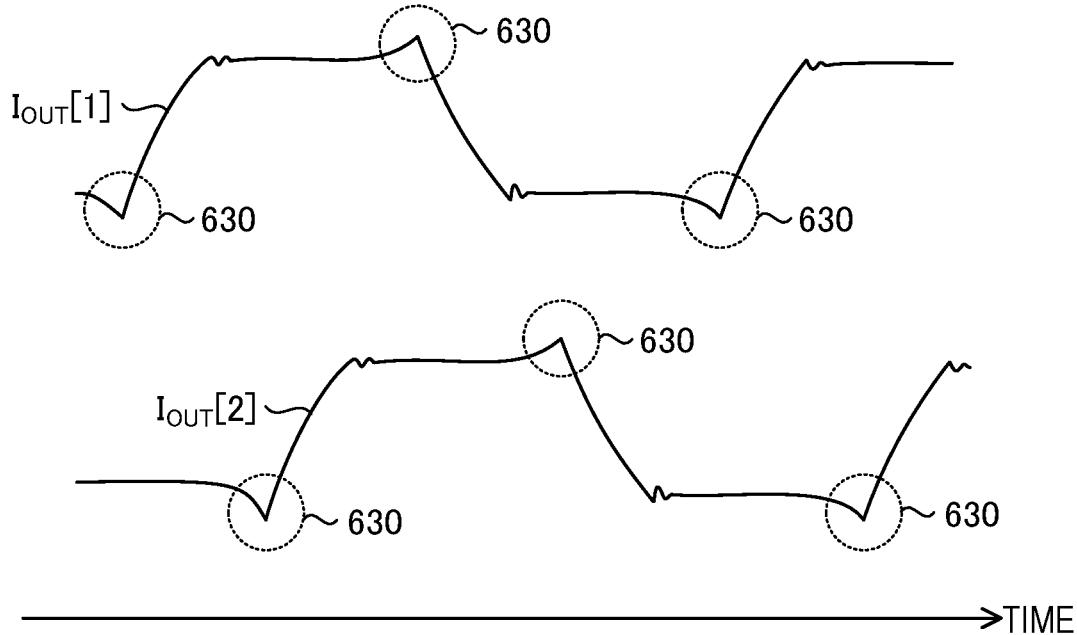
FIG. 9 is a diagram illustrating a current bump observed in the waveform of the output current to the motor coil in the full step excitation mode in the embodiment of the present disclosure.

While the above description deals with a case where the target current value $I_{TG}[1]$ is positive, a current bump can occur likewise when the target current value $I_{TG}[1]$ is negative. That is, a current bump denotes an event in which the magnitude of the output current $I_{OUT}[1]$ increases, against PWM constant current control, so far as to exceed the magnitude of the target current value $I_{TG}[1]$ (the target magnitude $|I_{REF}|$). While the above description focuses on the first channel, a current bump can occur in either of the first and second channels. FIG. 9 shows the waveforms of the output currents $I_{OUT}[1]$ and $I_{OUT}[2]$ observed when, during use of the full step excitation mode, a current bump (indicated by broken-line circles 630 in FIG. 9) occurs. Although, in the example of the waveform in FIG. 9, a current bump occurs in the latter half of the rectangular part of the waveform of the output currents with a substantially rectangular waveform, when a current bump occurs varies depending on the rotation speed of the rotor 210.

The current bump focused on in the embodiment can result from the counter-electromotive force that appears in the motor coils $L[1]$ and $L[2]$ as the rotor 210 rotates, and can occur when, as the decay mode, the slow decay mode is used, which involves a comparatively small decay in current. While, in the practical example shown in FIG. 8B, the output current $I_{OUT}[i]$ decreases during the decay mode, when the slow decay mode is used, depending on the counter-electromotive force that appears, the magnitude of the output current $I_{OUT}[i]$ can increase even when the i-th channel is in the slow decay state (see FIG. 6). When the fast decay mode is used as the decay mode, since the decay state involves a large decay in current, it is considered that no current bump occurs. The same applies to the mixed decay mode. Thus, it is assumed that, in the embodiment, as the decay mode, the slow decay mode is used. Note that, when, as the decay mode, the fast or mixed decay mode is used, operation may proceed as described below.

In the motor driver 100, the targets of the output currents $I_{OUT}[1]$ and $I_{OUT}[2]$ to be fed to the motor coils L[1] and L[2] are set by the current setting signal, and the current setting signal is composed of the reference voltages $V_{REF}[1]$ and $V_{REF}[2]$ that specify the target magnitudes of the output currents $I_{OUT}[1]$ and $I_{OUT}[2]$ and the internal control signals $CNT_F[1]$ and $CNT_F[2]$ that specify the target polarities of the output currents $I_{OUT}[1]$ and $I_{OUT}[2]$. Then, according to the change of the current setting signal, as the output currents $I_{OUT}[1]$ and $I_{OUT}[2]$ change, for example, as shown in FIG. 3, the rotor 210 rotates. When, after the current setting signal is changed, in accordance with the changed current setting signal, the polarity of the output current $I_{OUT}[i]$ is set to the target polarity (for example, positive polarity) and the magnitude of the output current $I_{OUT}[i]$ is set to the target magnitude (for example, $I_{REF}$), the control circuit 120[i], in accordance with the changed current setting signal, changes the output current $I_{OUT}[i]$ to a current (for example, $I_{REF}$) having the target polarity and target magnitude and then repeatedly performs the unit operation, which is a sequence of the power supply mode operation and the decay mode operation (corresponding to time point $t_{A1}$ and later in FIG. 8A) so as to make the magnitude of the output current $I_{OUT}[i]$ having the target polarity close to, and equal to or smaller than, the target magnitude.

The particular current waveform detector 160 shown in FIG. 1 detects, in the waveform of the output current $I_{OUT}[i]$, occurrence of a particular current waveform that meets a predetermined condition for discriminating a current bump. Meanwhile, after the start of repetition of the unit operation, the detector 160 detects, as the particular current waveform, a waveform (corresponding to the waveform at time points $t_{42}$ and $t_{43}$ in FIG. 8A) in which the magnitude of the output current $I_{OUT}[i]$ rises above the target magnitude (for example, $I_{REF}$). The particular current waveform here is a current waveform resulting from a current bump. To prevent a current waveform resulting from a slight bump from being detected as the particular current waveform, a condition for discriminating a current bump is set. In any of the practical examples described later, a current waveform that is recognized to be the particular current waveform meets the condition for discriminating a current bump. When occurrence of the particular current waveform is detected in at least one of the waveforms of the output currents $I_{OUT}[1]$ and $I_{OUT}[2]$ (in other words, when occurrence of the particular current waveform is recognized), the detector 160 substitutes "1" in a flag FLG (not shown) that the detector 160 uses. The initial value of the flag FLG is "0" and is kept at "0" unless occurrence of the particular current waveform is recognized. When "1" is substituted in the flag FLG, the detector 160 can transmit to the MPU 300 a predetermined detection signal indicating detection of occurrence of the particular current waveform. When "1" is substituted in the flag FLG, the detector 160 may transmit the detection signal in response to receipt of a predetermined request signal from the MPU 300 or may, without requiring receipt of a request signal or the like, transmit the detection signal in response to substitution of "1" in the flag FLG. After transmission of the detection signal, "0" may be substituted in the flag FLG, or the value of the flag FLG may be latched at "1".

The way a current bump occurs in the output current $I_{OUT}[i]$ depends on the load of the rotor 210 (the load that receives the torque generated by the rotor 210). For example, when the load of the rotor 210 is a belt (for example, a belt for feeding sheets in a copier) and the rotor 210 is coupled to it, as the belt sags due to degradation with age, the load of the rotor 210 reduces, and this makes a current bump more likely to occur than before degradation with age (however, it can be the other way around). In that case, it is possible to conveniently recognize degradation with age based on whether the detection signal described above is present.

Hereinafter, by way of a plurality of practical examples, specific examples of the operation of the motor driver 100 (in particular, the particular current waveform detector 160) will be described along with applied technologies, modified technologies, and the like. Unless otherwise stated or unless inconsistent, any features described above in connection with the embodiment applies to the practical examples described below. For any features of the practical examples that contradict what has been described above, their description given in connection with the practical examples may prevail. Unless inconsistent, any features of any of the plurality of practical examples can be applied to any other practical example (that is, any two or more of the plurality of practical examples can be implemented in any combination).

First Practical Example

Figure 10:
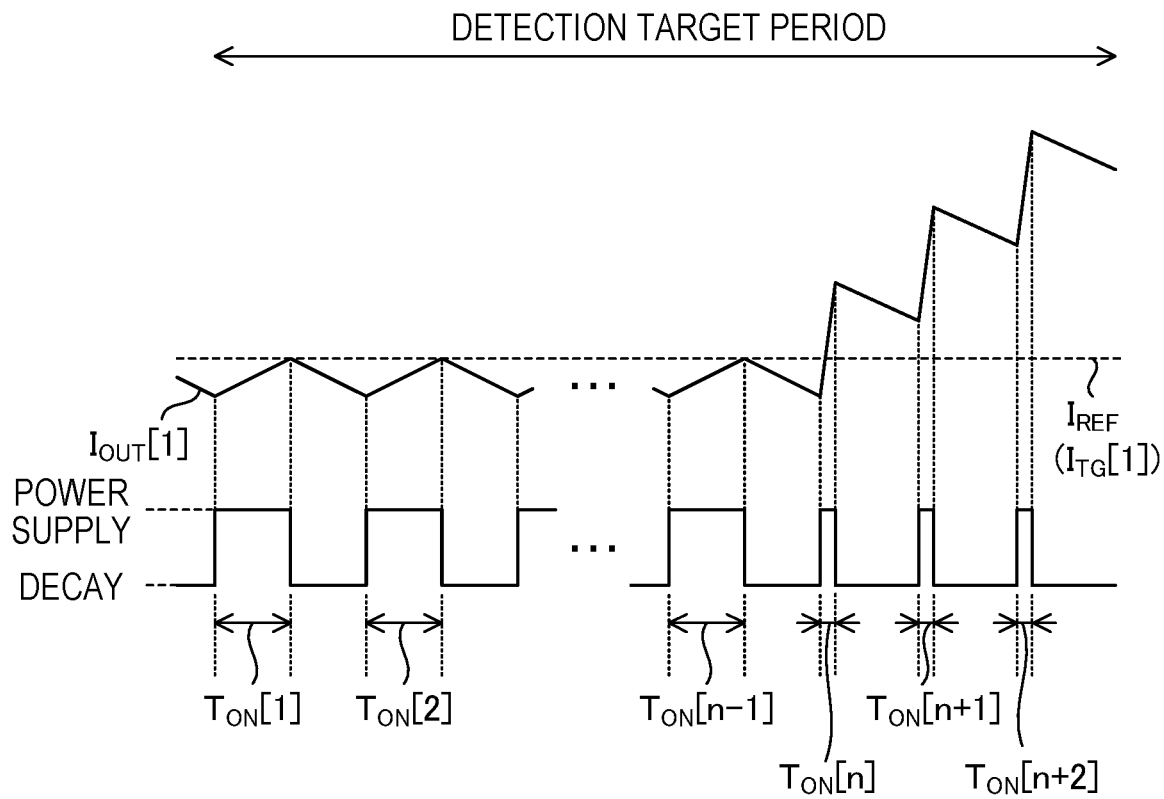
FIG. 10 is a schematic diagram illustrating a first method of detecting a particular current waveform for coping with a current bump in connection with a first practical example belonging to the embodiment of the present disclosure.

A first practical example will be described. The particular current waveform detector 160 according to the first practical example detects occurrence of a particular current waveform by a first detection method. FIG. 10 is a schematic diagram illustrating the first detection method.

To give a specific description, with focus on the first channel, it is assumed that $I_{TG}[i]>0$ and that a positive output current $I_{OUT}[i]$ is passing. That is, with focus on the period in which the states $ST_4$ and $ST_1$ in FIG. 3 occur, the first detection method in the focused period will be described. When the target current value $I_{TG}[1]$ switches from the current value $(-I_{REF})$ to the current value $I_{REF}$, the output current $I_{OUT}[1]$ changes its polarity from negative to positive as it increases toward the current value $I_{REF}$. Once the output current $I_{OUT}[1]$ reaches the current value $I_{REF}$, thereafter, during the period in which $I_{TG}[1]=I_{REF}$, PWM constant current control is performed so as to keep the output current $I_{OUT}[1]$ around the current value $I_{REF}$. In PWM constant current control, the unit operation is repeated as described above (see FIG. 5). Within the period in which $I_{TG}[1]=I_{REF}$, the period after the output current $I_{OUT}[1]$ has first reached the current value $I_{REF}$ and in which the unit operation is performed repeatedly in PWM constant current control is referred to as a detection target period.

In the detection target period, for each unit operation, the detector 160 detects the time for which the output stage circuit 130 [1] is in the power supply state as an output on time. Of a plurality of unit operations belonging to the detection target period, the output on time in the j-th unit operation is represented by the symbol "$T_{ON}[j]$". Here, j is any integer.

For example, the detector 160 may detect the output on time $T_{ON}[j]$ based on the gate voltages of the output transistors M1[1] to M4[1]. In this case, for each unit operation, the detector 160 detects, as the output on time, the length of time during which the gate voltage of the output transistor M1[1] is at low level and in addition the gate voltage of the output transistor M4[1] is at high level. With each of the output transistors M1[1] and M2[1] configured as P-channel MOSFETs, it is on when its gate voltage is at low level and is off when its gate voltage is at high level. With each of the output transistors M3[1] and M4[1] configured as N-channel MOSFETs, it is on when its gate voltage is at high level and is off when its gate voltage is at low level.

For another example, the detector 160 may detect the output on time $T_{ON}[j]$ based on the motor driving signal fed from the control logic 122[1] to the pre-driver 131[1] to specify the on/off states of the output transistors M[1] to M4[1]. For yet another example, the detector 160 may detect the output on time $T_{ON}[j]$ based on the voltage at the output terminal $A_{OUT}[1]$.

In the detection target period, the detector 160 sets a reference on time $T_{ONREF}$ based on one or more output on times that have been detected. When, for example, the output on time $T_{ON}[j]$ is obtained as the latest output on time, the output on time $T_{ON}[j]$ itself is set as the reference on time $T_{ONREF}$, or, the simple moving average or the weighted moving average of a total of q output on times $T_{ON}[j-q+1]$, $T_{ON}[j-q+2] \ldots, T_{ON}[j-1]$, and $T_{ON}[j]$ is set as the reference on time $T_{ONREF}$. Here, q is an integer of two or more.

Figure 11:
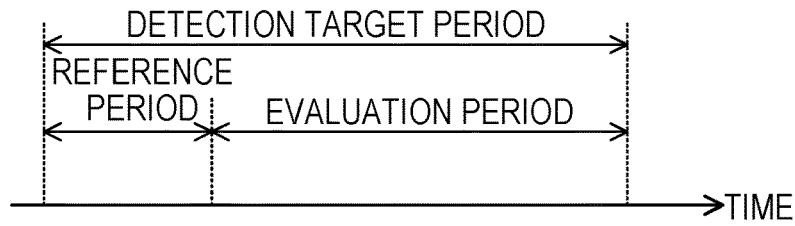
FIG. 11 is a diagram showing a relationship among a detection target period, a reference period, and an evaluation period in connection with the first practical example belonging to the embodiment of the present disclosure.

As shown in FIG. 11, the detection target period includes a reference period (a first period) and an evaluation period (a second period) occurring after the reference period. Based on one or more output on times in the reference period belonging to the detection target period, the detector 160 sets the reference on time $T_{ONREF}$. Then, occurrence of a current bump in the evaluation period is detected. A change in the mechanical angle of the rotor 210 occurs with a delay from a change in its electrical angle, and thus, after the start of PWM constant current control, no current bump due to a counter-electromotive force occurs for a while. Thus, in the detection target period, a period in which no current bump is likely to occur in design (a period in the first half of the detection target period) can be set as the reference period. For example, the reference period may be started at a time point when, after a switch from $I_{TG}[1]=-I_{RFF}$ to $I_{TG}[1]=I_{REF}$, the output current $I_{OUT}[1]$ first reaches the current value $I_{REF}$ and then a predetermined time for waiting for the output on time to stabilize has passed, and the reference period may be ended and the evaluation period started when as many output on times as needed for setting the reference on time $T_{ONREF}$ have been detected.

With the first detection method, the detector 160 detects occurrence of a particular current waveform (that is, occurrence of a current bump) based on change of the output on time during the detection target period. More specifically, with the first detection method, the detector 160 detects occurrence of a particular current waveform (that is, occurrence of a current bump) during the evaluation period by comparing the output on times detected sequentially during the evaluation period with the reference on time $T_{ONREF}$.

For example, the method proceeds as follows. Let one output on time during the evaluation period be called the evaluation on time. The detector 160 recognizes occurrence of a particular current waveform during the evaluation period if a precondition $CND1_A$ requiring that the evaluation on time be shorter than the reference on time $T_{ONREF}$ is met and in addition either of the following conditions $CND_{1B}$ and $CND_{1C}$ is met: a condition $CND_{1B}$ requiring that the absolute value of the difference between the reference on time $T_{ONREF}$ and the evaluation on time be equal to or larger than a predetermined difference threshold value $DIF_{TH1}$; and a condition $CND_{1C}$ requiring that the ratio of the evaluation on time to the reference on time $T_{ONREF}$ be equal to or smaller than a predetermined ratio threshold value $RATIO_{TH1}$.

Accordingly, when the evaluation on time equals the output on time $T_{ON}[n]$ (where n is any integer), if $T_{ONREF} > T_{ON}[n]$, the precondition $CND_{1A}$ is met, if $|T_{ONREF} - T_{ON}[n]| \geq DIF_{TH1}$, the condition $CND_{1B}$ is met, and if $T_{ON}[n]/T_{ONREF} < RATIO_{TH1}$, the condition $CND_{1C}$ is met.

The difference threshold value $DIF_{TH1}$ has a predetermined positive value expressed in time. The ratio threshold value $RATIO_{TH1}$ is a dimensionless quantity and has a predetermined positive value (for example, 0.5) smaller than one.

A configuration is also possible where the detector 160 takes a plurality of consecutive output on times during the evaluation period as a plurality of evaluation on times and recognizes occurrence of a particular current waveform during the evaluation period only if each of the plurality of evaluation on times meets the precondition $CND_{1A}$ as well as the condition $CND_{1B}$ or $CND_{1C}$.

If a current bump occurs during the evaluation period, the output on time during the evaluation period is expected to become shorter than the output on time during the reference period. Thus, it is possible to accurately detect occurrence of the particular current waveform by checking whether the conditions described above are met.

While the first detection method has been described with focus on the period in which, for the first channel, $I_{TG}[1]=I_{REF}$, the first detection method is applicable likewise to any other periods (for example, the period in which $I_{TG}[1]=-I_{REF}$) and also to the second channel.

Second Practical Example

Figure 12:
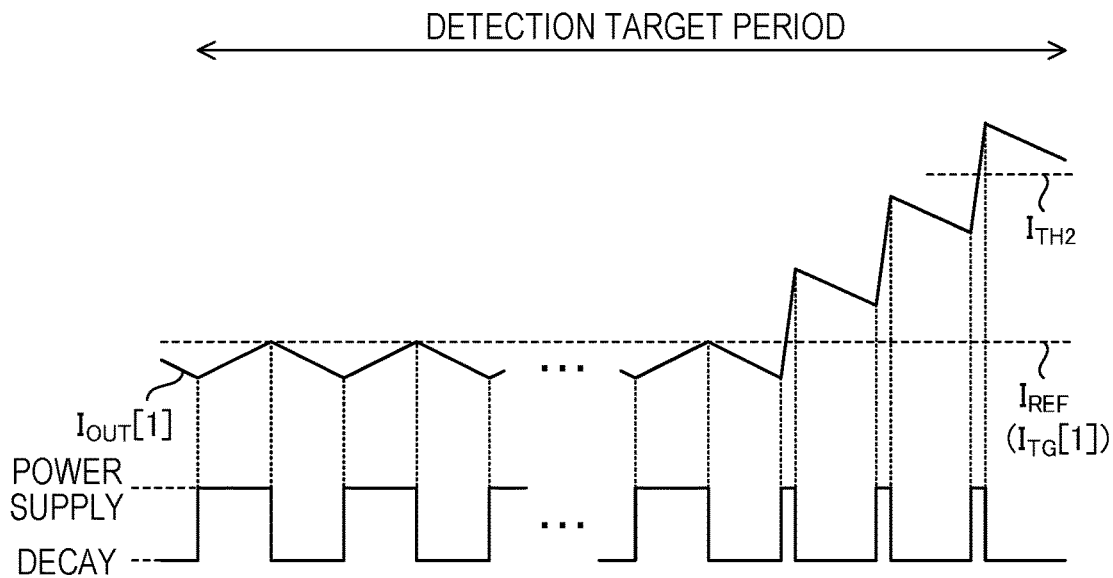
FIG. 12 is a schematic diagram illustrating a second method of detecting a particular current waveform for coping with a current bump in connection with a second practical example belonging to the embodiment of the present disclosure.

A second practical example will be described. A particular current waveform detector 160 according to the second practical example detects occurrence of a particular current waveform by a second detection method. Also in the second practical example, to give a specific description, with focus on the first channel, it is assumed that $I_{TG}[1]>0$ and that a positive output current $I_{OUT}[1]$ is passing. Attention will be paid to the detection target period (see FIG. 10) mentioned in connection with the first practical example. FIG. 12 is a schematic diagram illustrating the second detection method.

The detector 160 according to the second practical example sets a current threshold value $I_{TH2}$ greater than the target magnitude of the output current $I_{OUT}[1]$ during the detection target period in which the unit operation is repeated, and detects occurrence of a particular current waveform (that is, occurrence of a current bump) based on a comparison between the current threshold value $I_{TH2}$ and the magnitude of the output current $I_{OUT}[1]$.

As described above, the target magnitude of the output current $I_{OUT}[1]$ is the target of the magnitude of the output current $I_{OUT}[1]$, and is the magnitude (absolute value $|I_{TG}[1]|$) of the target current value $I_{TG}[1]$. Here, it is assumed that $I_{TG}[1]>0$, and thus an current threshold value $I_{TH2}$ greater than the target current value $I_{TG}[i]$ can be set.

Considering that the target current value $I_{TG}[1]$ can be negative, the current threshold value $I_{TH2}$ can be set according to Expression (2A) or (2B) below. Here, $\Delta_2$ has a predetermined positive value, and $k_2$ has a predetermined value (e.g., 1.1) greater than one.

$$I_{TH2}=|I_{TG}[1]|+\Delta_2 \quad (2A)$$

$$I_{TH2}=|I_{TG}[1]|\times k_2 \quad (2B)$$

With the second detection method, in the detection target period, the detector 160 recognizes occurrence of a particular current waveform on detecting an output current $I_{OUT}[1]$ with a magnitude equal to or greater than the current threshold value $I_{TH2}$. The detector 160 can detect the output current $I_{OUT}[1]$ at any sampling timing during the detection target period. For example, in each unit operation during the detection target period, the output current $I_{OUT}[1]$ immediately before the end of the power supply mode operation can be sampled and detected and, if the magnitude of the output current $I_{OUT}[1]$ detected is equal to or greater than the current threshold value $I_{TH2}$, occurrence of a particular current waveform can be recognized. It is instead also possible to sample the output current $I_{OUT}[1]$ in each of a plurality of consecutive unit operations and recognize occurrence of a particular current waveform only if the plurality of magnitudes of the output current $I_{OUT}[1]$ sampled in the plurality of unit operations are all equal to or greater than the current threshold value $I_{TH2}$.

The detector 160 receives a signal indicating the result of detection of the output current $I_{OUT}[1]$. The signal indicating the result of detection of the output current $I_{OUT}[1]$ can be the detection voltage $V_{RNF}[1]$ obtained using the resistor $R[1]$, or any other signal obtained using a current sensor other than the resistor $R[1]$. A current sensor other than the resistor $R[1]$ is arranged at a point where the output current $I_{OUT}[1]$ passes or a current proportional to it passes, and based on the result of detection by that current sensor, the output current $I_{OUT}[1]$ is detected (as by its magnitude being detected).

While the second detection method has been described with focus on the period in which, for the first channel, $I_{TG}[1]=I_{REF}$, the second detection method can be applied likewise to any other periods (for example, the period in which $I_{TG}[1]=-I_{REF}$) and also to the second channel.

Third Practical Example

Figure 13:
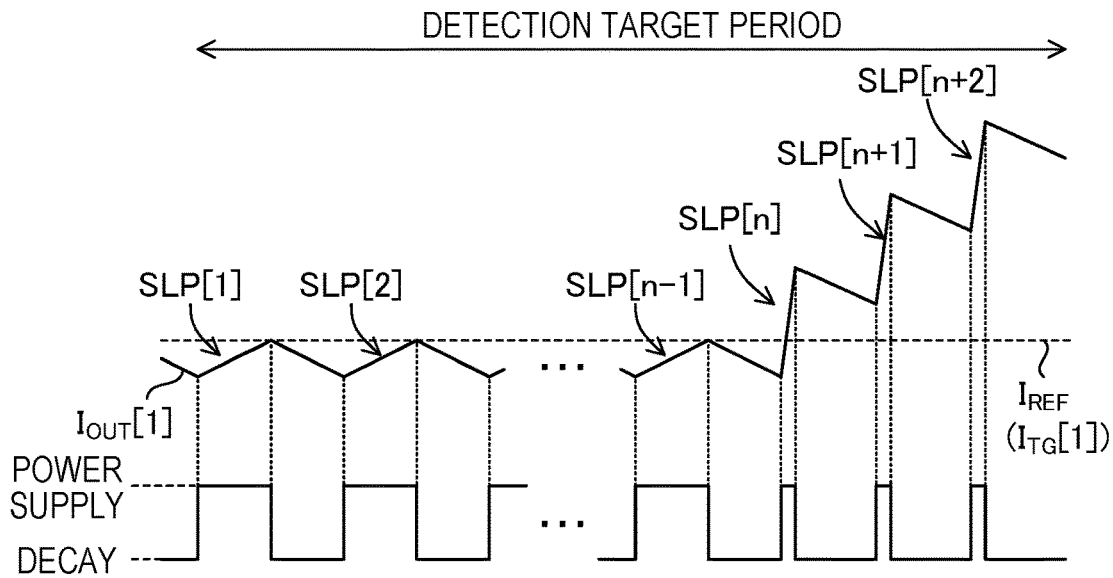
FIG. 13 is a schematic diagram illustrating a third method of detecting a particular current waveform for coping with a current bump in connection with a third practical example belonging to the embodiment of the present disclosure.

A third practical example will be described. A particular current waveform detector 160 according to the third practical example detects occurrence of a particular current waveform by a third detection method. Also in the third practical example, to give a specific description, with focus on the first channel, it is assumed that $I_{TG}[1]>0$ and that a positive output current $I_{OUT}[1]$ is passing. Attention will be paid to the detection target period (see FIG. 10) mentioned in connection with the first practical example. FIG. 13 is a schematic diagram illustrating the third detection method.

With the third detection method, the detector 160, during the detection target period in which the unit operation is repeated, detects occurrence of a particular current waveform (that is, occurrence of a current bump) based on the slope of increase of the magnitude of the output current $I_{OUT}[1]$ with the output stage circuit 130[1] in the power supply state. When $I_{OUT}[1]>0$, increase of the magnitude of the output current $I_{OUT}[1]$ is equivalent to increase of the output current $I_{OUT}[1]$. In the following description, the slope of increase of the magnitude of the output current $I_{OUT}[1]$ is referred to as the current slope SLP.

In the detection target period, for each unit operation, the detector 160 detects the current slope SLP of the output current $I_{OUT}[1]$ with the output stage circuit 130[1] in the power supply state. Of the plurality of unit operations that belong to the detection target period, the current slope SLP of the output current $I_{OUT}[1]$ in the j-th unit operation is identified specifically by the symbol "SLP[j]", where j is any integer.

For the detection of the current slope SLP, the detector 160 receives a signal indicating the result of detecting the output current $I_{OUT}[1]$. The signal indicating the result of detecting the output current $I_{OUT}[1]$ may be, as mentioned in connection with the second practical example, the detection voltage $V_{RNF}[1]$ obtained using the resistor $R[1]$, or any other signal obtained using a current sensor other than the resistor $R[1]$. With respect to the j-th unit operation, the current slope SLP [j] is determined by dividing, by the duration of the power supply mode operation, the absolute value of the difference between the detected value of the output current $I_{OUT}[1]$ at the start timing of the power supply mode operation and the detected value of the output current $I_{OUT}[1]$ at the end timing of the power supply mode operation.

With the third detection method, in the detection target period, the detector 160 recognizes occurrence of a particular current waveform on detecting a current slope SLP[j] equal to or greater than a predetermined slope threshold value $SLP_{TH3}$. That is, with respect to the j-th unit operation during the detection target period, if the acquired current slope SLP[j] is equal to or greater than a predetermined slope threshold value $SLP_{TH3}$, the detector 160 can recognize occurrence of a particular current waveform. It is instead also possible to recognize occurrence of a particular current waveform only if a plurality of consecutively detected current slopes (e.g., SLP[n], SLP[n+1], and SLP [n+2]) are all equal to or greater than the slope threshold value $SLP_{TH3}$.

If, during the detection target period, a current bump occurs, the current slope SLP mentioned above is expected to increase; thus, with the method described above, it is possible to detect occurrence of a particular current waveform.

With the third detection method, it is also possible to set a reference period and an evaluation period as shown in FIG. 11, and detect occurrence of a particular current waveform through a comparison of the current slope SLP during the reference period and the current slope SLP during the evaluation period. This will now be described as a modified version of the third detection method. The reference period and the evaluation period have the same significance as mentioned in connection with the first practical example.

The detector 160 sets a reference slope $SLP_{REF}$ based on one or more current slopes SLP detected during the reference period. For example, suppose that a current slope SLP[j] is obtained as the most recent current slope SLP, the current slope SLP[j] is as it is taken as the reference slope $SLP_{REF}$, or, the simple moving average or weighted moving average of a total of q current slopes SLP[j−q+1], SLP[j−q+2] SLP[j−1], and SLP[j] is taken as the reference slope $SLP_{REF}$, where q is any integer of two or more. For example, the reference period may be started at a time point when, after a switch from $I_{TG}[1]=-I_{RFF}$ to $I_{TG}[1]=I_{REF}$, the output current $I_{OUT}[1]$ first reaches the current value $I_{REF}$ and then a predetermined time for waiting for the current slope SLP to stabilize has passed, and the reference period may be ended and the evaluation period started when as many current slopes SLP as needed for setting the reference slope $SLP_{REF}$ have been detected.

With the modified version of the third detection method, the detector 160 detects occurrence of a particular current waveform (that is, occurrence of a current bump) based on change of the current slope SLP during the detection target period. More specifically, with the modified version of the third detection method, the detector 160 detects occurrence of a particular current waveform (that is, occurrence of a current bump) during the evaluation period by comparing current slopes SLP detected consecutively during the evaluation period with the reference slope $SLP_{REF}$.

For example, the method proceeds as follows. Let one current slope SLP during the evaluation period be called the evaluation slope. The detector 160 recognizes occurrence of a particular current waveform during the evaluation period if a precondition $CND_{3A}$ requiring that the evaluation slope be greater than the reference slope $SLP_{REF}$ is met and in addition either of the following conditions $CND_{3B}$ and $CND_{3C}$ is met: a condition $CND_{3B}$ requiring that the absolute value of the difference between the reference slope $SLP_{REF}$ and the evaluation slope is equal to or greater than a predetermined difference threshold value $DIF_{TH3}$; and a condition $CND_{3C}$ requiring that the ratio of the evaluation slope to the reference slope $SLP_{REF}$ is equal to or greater than a predetermined ratio threshold value $RATIO_{TH3}$.

Accordingly, in a case where the current slope SLP[n] is taken as the evaluation slope (where n is any integer), if $SLP_{REF}<SLP[n]$, the precondition $CND_{3A}$ is met, if $|SLP[n]-SLP_{REF}| \geq DIF_{TH3}$, the condition $CND_{3B}$ is met, and if $SLP[n]/SLP_{REF} \geq RATIO_{TH3}$, the condition $CND_{3C}$ is met.

The difference threshold value $DIF_{TH3}$ has a predetermined positive value. The ratio threshold value $RATIO_{TH3}$ has a predetermined positive value (e.g., two) greater than one.

The detector 160 may take a plurality of consecutive current slopes SLP during the evaluation period as a plurality of evaluation slopes and recognize occurrence of a particular current waveform during the evaluation period only if each of the plurality of evaluation slopes meets the precondition $CND_{3A}$ as well as either of the conditions $CND_{3B}$ and $CND_{3C}$.

While the third detection method has been described with focus on the period in which, for the first channel, $I_{TG}[1]=I_{REF}$, the third detection method can be applied likewise to any other periods (e.g., the period in which $I_{TG}[1]=-I_{REF}$), and can be applied likewise also to the second channel.

Fourth Practical Example

Figure 14:
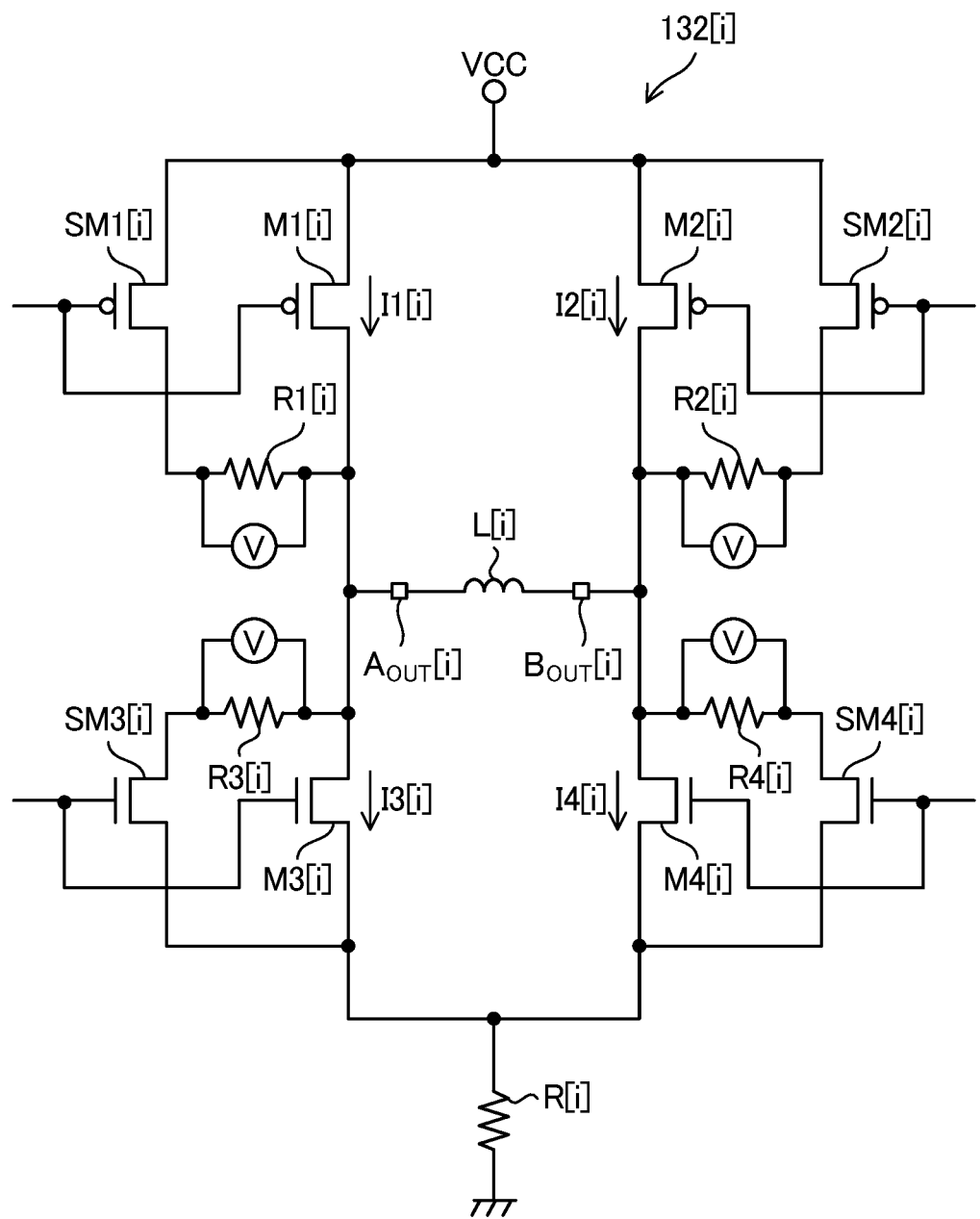
FIG. 14 is a configuration diagram for detection of currents through output transistors in connection with a fourth practical example belonging to the embodiment of the present disclosure.

A fourth practical example will be described. The motor driver 100 includes transistor current sensors that sense individually the currents through a plurality of output transistors that constitute half-bridge circuits 132[1] and 132[2]. FIG. 14 shows the transistor current sensors provided for the half-bridge circuit 132[i] in the i-th channel along with the half-bridge circuit 132[i]. In FIG. 14, the parasitic diodes in the transistors are omitted from illustration.

The transistor current sensor for the half-bridge circuit 132[i] includes a sense transistor SM1[i] and a sense resistor R1[i] corresponding to the output transistor M1[i], a sense transistor SM2[i] and a sense resistor R2[i] corresponding to the output transistor M2[i], a sense transistor SM3[i] and a sense resistor R3[i] corresponding to the output transistor M3[i], and a sense transistor SM4[i] and a sense resistor R4[i] corresponding to the output transistor M4[i]. The sense transistors SM1[i] and SM2[i] are configured as P-channel MOSFETs to suit the output transistors M1[i] and M2[i], and the sense transistors SM3 [i] and SM4[i] are configured as N-channel MOSFETs to suit the output transistors M3[i] and M4[i].

Between the transistors SM1[i] and M1[i], the sources are connected together and the gates are connected together. Likewise, between the transistors SM2[i] and M2[i], the sources are connected together and the gates are connected together. Likewise, between the transistors SM3[i] and M3[i], the sources are connected together and the gates are connected together. Likewise, between the transistors SM4 [i] and M4[i], the sources are connected together and the gates are connected together.

The drain of the sense transistor SM1[i] is connected via the sense resistor R1[i] to the drain of the output transistor M1[i]. The drain of the sense transistor SM2[i] is connected via the sense resistor R2[i] to the drain of the output transistor M2[i]. The drain of the sense transistor SM3[i] is connected via the sense resistor R3[i] to the drain of the output transistor M3[i]. The drain of the sense transistor SM4[i] is connected via the sense resistor R4[i] to the drain of the output transistor M4[i].

The source area ratio between an output transistor and a sense transistor is set such that the ratio between the drain current through a given output transistor and the drain current through the sense transistor corresponding to that output transistor has a predetermined value (e.g., 100:1). Accordingly, the transistor current sensors can sense the currents through the output transistors M1[i], M2[i], M3[i], and M4[i] by detecting the voltage drops across the sense resistors R1[i], R2[i], R3[i], and R4[i]. The currents through the output transistors M1[i], M2[i], M3[i], and M4[i] are represented by I1[i], I2[i], I3[i], and I4[i].

The transistor current sensor for the first channel is one example of a current sensor other than the resistor R[1] mentioned in connection with the second and third practical examples. The same applies to the transistor current sensor for the second channel.

The output current $I_{OUT}[i]$ passes through two of the output transistors M1[i] to M4[i], and thus the detector 160 can recognize the output current $I_{OUT}[i]$ based on the respective gate voltages of the output transistors M1[i] to M4[i] (i.e., the on/off states of the output transistors M1[i] to M4[i]) and the currents I1[i] to I4[i]. Moreover, based on the results of detection of the currents through the output transistors M1[i] to M4[i] (i.e., the voltage drops across the sense resistors R1[i] to R4[i]), the detector 160 can acquire the current waveforms in the output transistors M1[i] to M4[i] in accordance with the output current $I_{OUT}[i]$. The current waveforms in the output transistors M1[i] to M4[i] correspond to the waveforms of the currents I1[i] to I4[i].

On the other hand, though no specific waveforms are illustrated, the current waveforms in the output transistors M1[i] to M4[i] exhibit a distinctive current waveform when a current bump occurs as is not observed when no current bump occurs. Accordingly, with a fourth detection method according to the fourth practical example, it is possible to detect occurrence of a particular current waveform in the following manner.

For example, such a current waveform in the output transistors M1[i] to M4[i] exhibit as is expected to be observed if a current bump occurs during the period in which, for the first channel, $I_{TG}[1]=I_{REF}$ is acquired through experiments or the like at the stage of the designing of the motor driver 100. The current waveform thus acquired is taken as a reference current waveform (predetermined current waveform), and waveform information representing the reference current waveform is stored in a non-volatile memory (not shown) within the detector 160. Afterwards, when the motor driver 100 built in the motor driving system SYS goes into actual operation, during the detection target period (see FIG. 10) mentioned above, the detector 160 compares the current waveforms in the output transistors M1[1] to M4[1] (the results of detecting the currents I1[1] to I4[1]) with the reference current waveform based on the waveform information in the non-volatile memory; based on the similarity between those waveforms, the detector 160 can then detect occurrence of a particular current waveform. Similarity between waveforms can be evaluated by any known method. If the degree of similarity of the current waveforms in the output transistors M1[1] to M4[1] acquired during the detection target period to the reference current waveform is equal to or higher than a predetermined threshold value, the detector 160 can recognize occurrence of a particular current waveform.

While the fourth detection method has been described with focus on the period in which, for the first channel, $I_{TG}[1]=I_{REF}$, the fourth detection method can be applied likewise to any other periods (for example, the period in which $I_{TG}[1]=-I_{REF}$), and can be applied likewise also to the second channel.

The motor driver 100 includes an overcurrent protection circuit (not shown). On sensing a flow of the output current $I_{OUT}[i]$ with a magnitude equal to or greater than a predetermined overcurrent protection threshold value, the overcurrent protection circuit recognizes the i-th channel to be in an overcurrent state. On recognizing the i-th channel to be in an overcurrent state, the overcurrent protection circuit turns off all the output transistors M1[i] to M4[i] in the i-th channel and latches (holds) their off states, or turns off all the output transistors M1[1] to M4[1] and M1[2] to M4[2] in the first and second channels and latches (holds) their off states. Based on the results of detection of the currents I1[i] to I4[i] by the transistor current sensors mentioned above, the overcurrent protection circuit can sense the magnitude of the output current $I_{OUT}[i]$ to be compared with the overcurrent protection threshold value. That is, by referring to, as the magnitude of the output current $I_{OUT}[i]$, one of the magnitudes of the currents I1[i] to I4[i] detected based on the voltage drops across the sense resistors R1[i] to R4[i], the overcurrent protection circuit can compare the magnitude of the output current $I_{OUT}[i]$ thus referred to with the overcurrent protection threshold value. This overcurrent protection threshold value is greater than the current threshold value $I_{TH2}$ (see FIG. 12) mentioned in connection with the second practical example. That is, a current bump means so small a bump in the output current $I_{OUT}[i]$ as not to be targeted by overcurrent protection.

Fifth Practical Example

A fifth practical example will be described. When a current bump occurs, depending on the rotation speed of the rotor 210, the current bump is likely to occur in the latter half of the rectangular part of the waveform of the output current $I_{OUT}[i]$ with a substantially rectangular waveform (see FIG. 9). Out of these considerations, the particular current waveform detector 160 according to the fifth practical example detects occurrence of a particular current waveform by a fifth detection method described below.

Figure 15:
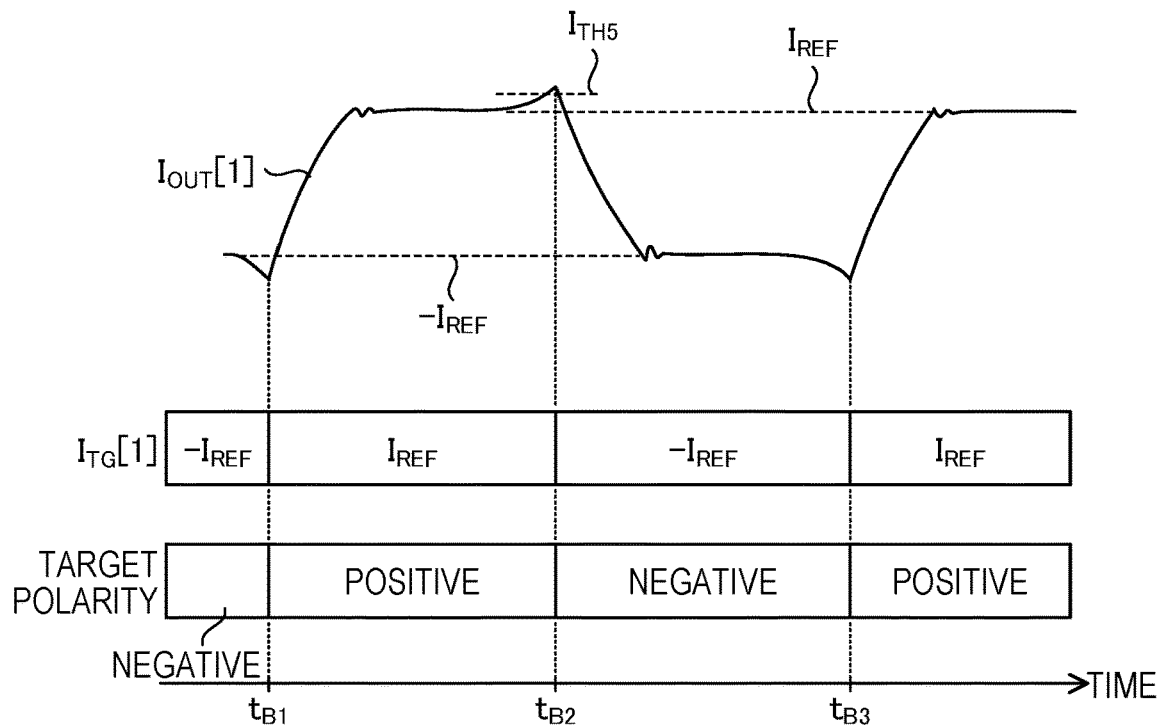
FIG. 15 is a schematic diagram illustrating a fifth method of detecting a particular current waveform for coping with a current bump in connection with a fifth practical example belonging to the embodiment of the present disclosure.

FIG. 15 is a schematic diagram illustrating the fifth detection method. To give a specific description, with focus on the first channel, a situation is assumed where, at time point $t_{B1}$, the target current value $I_{TG}[1]$ switches from the current value $(-I_{REF})$ to the current value $I_{REF}$; then, at time point $t_{B2}$, the target current value $I_{TG}[1]$ switches from the current value $I_{REF}$ to the current value $(-I_{REF})$; and then, at time point $t_{B3}$, the target current value $I_{TG}[1]$ switches from the current value $(-I_{REF})$ to the current value $I_{REF}$. In this case, the target polarity of the output current $I_{OUT}[1]$ switches from negative to positive at time point $t_{B1}$, from positive to negative at time point $t_{B2}$, and from negative to positive at time point $t_{B3}$.

When, at time point $t_{B1}$, the target current value $I_{TG}[1]$ switches from the current value $(-I_{REF})$ to the current value $I_{REF}$, the output current $I_{OUT}[1]$ changes its polarity from negative to positive as it increases toward the current value $I_{REF}$. Once the output current $I_{OUT}[1]$ reaches the current value $I_{REF}$, thereafter, during the period in which $I_{TG}[1]=I_{REF}$, PWM constant current control is performed so as to keep the output current $I_{OUT}[1]$ around the current value $I_{REF}$. In PWM constant current control, the unit operation is repeated as described above (see FIG. 5). Here, attention will be paid to and around time point $t_{B2}$, when a predetermined time has passed since repetition of the unit operation is started under PWM constant current control.

Figure 16:
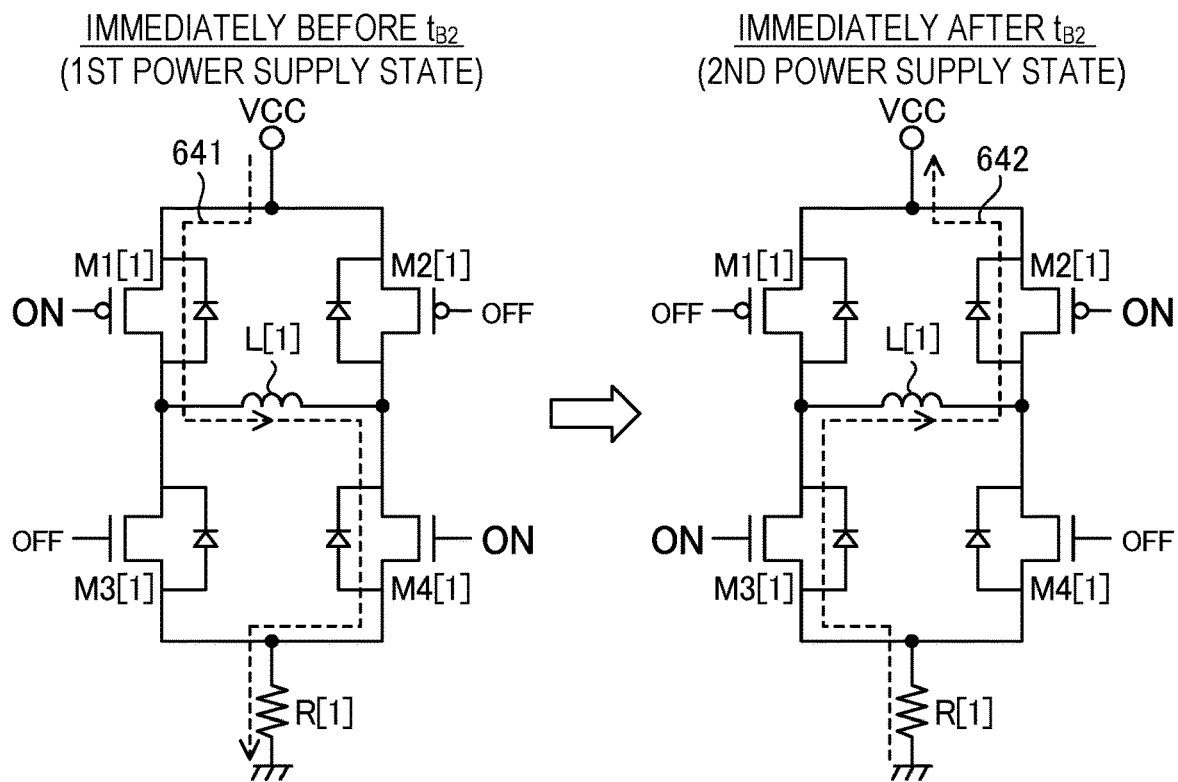
FIG. 16 is a diagram showing the state transition of output transistors that accompanies switching of the target polarity of the output current in connection with the fifth practical example belonging to the embodiment of the present disclosure.

FIG. 16 shows the power supply state (hereinafter referred to as a first power supply state) for the first channel in the unit operation immediately before time point $t_{B2}$ and the power supply state (hereinafter referred to as a second power supply state) for the first channel immediately after time point $t_{B2}$. Arrowed broken lines 641 and 642 in FIG. 16 indicate the flow of the current in the first and second power supply states respectively.

In the first channel, in the first power supply state, out of the output transistors M1[1] to M4[1], only the output transistors M1[1] and M4[1] are on, and a positive output current $I_{OUT}[1]$ passes from the terminal fed with the supply voltage VCC via the output transistor M1[1], the motor coil L[1], the output transistor M4[1], and the resistor R[1] toward the ground.

When the target current value $I_{TG}[1]$ switches from the current value $I_{REF}$ to the current value $(-I_{REF})$ at time point $t_{B2}$, the state of the full-bridge circuit 132[1] in the first channel switches to the second power supply state at time point $t_{B2}$. In the second power supply state, the output transistors M2[1] and M3[1] are on and in addition the output transistors M1[1] and M4[1] are off. While, in the first channel, the second power supply state is a state suitable for supplying a negative output current $I_{OUT}[1]$, immediately after time point $t_{B2}$, a positive output current $I_{OUT}[1]$ equivalent to that immediately before time point $t_{B2}$ passes as the coil current continues to pass. That is, immediately after time point $t_{B2}$, a positive output current $I_{OUT}[1]$ passes as a regeneration current from the ground via the resistor R[1], the output transistor M3[1], the motor coil L[1], and the output transistor M2[1] toward the terminal fed with the supply voltage VCC. As time passes after time point $t_{B2}$, the magnitude of the positive output current $I_{OUT}[1]$ decreases, and eventually the output current $I_{OUT}[1]$ changes its polarity to negative. Then, the second power supply state is maintained until the output current $I_{OUT}[1]$ reaches the current value $(-I_{REF})$, and once the output current $I_{OUT}[1]$ reaches the current value $(-I_{REF})$, thereafter, during the period in which $I_{TG}[1]=$PWM constant current control is performed to keep the output current $I_{OUT}[1]$ around the current value $(-I_{REF})$.

With the fifth detection method, the detector 160 refers to the magnitude of the output current $I_{OUT}[1]$ immediately after time point $t_{B2}$ as an evaluation value $I_{EV}[1]$. On the other hand, the detector 160 sets a current threshold value $I_{TH5}$ greater than the target magnitude of the output current $I_{OUT}[1]$ immediately before time point $t_{B2}$, and, based on a comparison between the current threshold value $I_{TH5}$ and the evaluation value $I_{EV}[1]$, detects occurrence of a particular current waveform (that is, occurrence of a current bump). Here, "immediately after time point $t_{B2}$" can be understood as a time point when a predetermined minute time has passed after time point $t_{B2}$. The detector 160 can acquire the evaluation value $I_{EV}[1]$ based on, for example, the detection voltage $V_{RNF}[1]$.

As described above, the target magnitude of the output current $I_{OUT}[1]$ is the target of the magnitude of the output current $I_{OUT}[1]$, and is the magnitude (absolute value $|I_{TG}[1]|$) of the target current value $I_{TG}[1]$. Immediately before time point $t_{B2}$, $I_{TG}[1]>0$; thus, a current threshold value $I_{TH5}$ greater than the target current value $I_{TG}[i]$ can be set. Specifically, considering that the target current value $I_{TG}[1]$ can be negative, the current threshold value $I_{TH5}$ can be set according to Expression (5A) or (5B) below. Here, $\Delta_5$ has a predetermined positive value, and $k_5$ has a predetermined value (e.g., 1.1) greater than one. In Expression (5A) or (5B) below, $|I_{TG}[1]|$ represents the absolute value of the target current value $I_{TG}[1]$ immediately before time point $t_{B2}$. If, immediately before the time point $t_{B2}$, $I_{TG}[1]>0$ as in this example, it is not necessary to take the absolute value.

$$I_{TH5}=|I_{TG}[1]|+\Delta_5 \tag{5A}$$

$$I_{TH5}=|I_{TG}[1]|\times k_5 \tag{5B}$$

With the fifth detection method, the detector 160 recognizes occurrence of a particular current waveform when the evaluation value $I_{EV}[1]$ is equal to or greater than the current threshold value $I_{TH5}$.

While the fifth detection method has been described with focus on the time point ($t_{B2}$) at which, for the first channel, the target current value switches from $I_{TG}[1]>0$ to $I_{TG}[1]<0$, the fifth detection method is applicable likewise to the time point at which the target current value switches from $I_{TG}[1]<0$ to $I_{TG}[1]>0$, and is applicable likewise also to the second channel.

Sixth Practical Example

A sixth practical example will be described.

The motor driving system SYS and the motor driver 100 according to the embodiment find applications in sheet feeders in copiers and printers, image readers in scanners, and in any devices that employ stepping motors.

For any signal or voltage, the relationship between its high and low levels may be reversed so long as that can be done without departure from what has been described above.

Embodiments of the present disclosure can be modified in many ways as necessary without departure from the scope of the technical concepts defined in the appended claims. The embodiments described herein are merely examples of how the present disclosure can be implemented, and what is meant by any of the terms used to describe the present disclosure and its constituent elements is not limited to what is specifically mentioned in connection with the embodiments. The specific values mentioned in the above description are merely illustrative and needless to say can be modified to different values.

<<Notes>>

To follow are notes in connection with the present disclosure of which specific examples of implementation have been described by way of practical examples above.

According to one aspect of the present disclosure, a driver device (100) for a stepping motor having a rotor (210) and a coil (L[i]) includes: an output stage circuit (130[i]) configured to supply an output current ($I_{OUT}[i]$) to the coil by applying a voltage to the coil; a control circuit (120[i]) configured to control the output stage circuit based on a current setting signal ($CNT_P[i]$, $V_{REF}[i]$) for setting the target of the output current to be supplied to the coil and a current sense signal ($V_{RNF}[i]$) indicating the result of sensing of the output current; and a particular current waveform detector (160) configured to detect occurrence of a particular current waveform in the waveform of the output current. The rotor rotates according to change of the output current based on change of the current setting signal. When the current setting signal is changed to require that, according to the current setting signal changed, the polarity of the output current be set to a target polarity and the magnitude of the output current be set to a target magnitude (e.g., corresponding to a switch from $I_{TG}[i]=-I_{REF}$ to $=I_{REF}$), the control circuit changes the output current to a current having the target polarity and the target magnitude according to the current setting signal changed (e.g., changes from $I_{OUT}[i]=-I_{REF}$ to $I_{OUT}[i]=I_{REF}$) and then, to approximate the magnitude of the output current to the target magnitude, the control circuit repeatedly performs a unit operation which is a sequence of a power supply mode operation and a decay mode operation. In the power supply mode operation, the output stage circuit is in a power supply state in which the output stage circuit supplies electric power to the coil to increase the magnitude of the output current and, in the decay mode operation, the output stage circuit is in a decay state in which the output stage circuit suspends supplying the electric power to decrease the magnitude of the output current (e.g., see FIG. 6). After the start of repetition of the unit operation, the particular current waveform detector detects, as the particular current waveform, a waveform with which the magnitude of the output current increases above the target magnitude and, on detecting occurrence of the particular current waveform, the particular current waveform detector transmits a predetermined detection signal to a device external to the driver device. (A first configuration.)

In the driver device of the first configuration described above, during the repetition of the unit operation, the control circuit may control the output stage circuit so as to approximate the magnitude of the output current to the target magnitude such that the magnitude of the output current is equal to or smaller than the target magnitude. The particular current waveform may be a waveform with which the magnitude of the output current increases above the target magnitude against the control by the control circuit due to a counter-electromotive force appearing in the coil as the rotor rotates. (A second configuration.)

In the driver device of the first or second configuration described above, in each unit operation, the control circuit may perform the power supply mode operation at least for a predetermined forced power supply time. If the magnitude of the output current is detected to be equal to or greater than the target magnitude when, after the start of the power supply mode operation, the forced power supply time has elapsed, the control circuit may end the power supply mode operation and performs the decay mode operation for a predetermined decay time. (A third configuration.)

In the driver device of any of the first to third configurations described above (the first embodiment; see FIG. 10), the particular current waveform detector may detect, as an output on time ($T_{ON}[j]$), the time during which, in each unit operation, the output stage circuit is in the power supply state and may detect occurrence of the particular current waveform based on change of the output on time during a detection target period in which the unit operation is repeated. (A fourth configuration.)

In the driver device of the fourth configuration described above, the detection target period may include a first period and a second period occurring after the first period. The particular current waveform detector may set a reference on time based on one or more output on times detected as the output on time during the first period and may detect occurrence of the particular current waveform during the second period based on a comparison between the reference on time and the output on time during the second period. (A fifth configuration.)

In the driver device of the fifth configuration described above, in a case where an evaluation on time, which is the output on time during the second period, is shorter than the reference on time, if the absolute value of the difference between the reference on time and the evaluation on time is equal to or greater than a predetermined difference threshold value or if the ratio of the evaluation on time to the reference on time is equal to or smaller than a predetermined ratio threshold value, the particular current waveform detector may recognize occurrence of the particular current waveform during the second period. (A sixth configuration.)

In the driver device of any of the first to third configurations described above (the second embodiment; see FIG. 12), during a detection target period in which the unit operation is repeated, the particular current waveform detector may detect occurrence of the particular current waveform using a current threshold value ($I_{TH2}$) greater than the target magnitude ($I_{REF}$) based on a comparison between the current threshold value and the magnitude of the output current. (A seventh configuration.)

In the driver device of the seventh configuration described above, the particular current waveform detector may recognize occurrence of the particular current waveform if, during the detection target period, the output current with a magnitude equal to or greater than the current threshold value is sensed. (An eighth configuration.)

In the driver device of any of the first to third configurations described above (the third embodiment; see FIG. 13), the particular current waveform detector may detect occurrence of the particular current waveform based on the slope ($SLP[j]$) of increase of the magnitude of the output current with the output stage circuit in the power supply state during a detection target period in which the unit operation is repeated. (A ninth configuration.)

In the driver device of the ninth configuration described above, during the detection target period, the particular current waveform detector may detects the slope of increase of the magnitude of the output current with the output stage circuit in the power supply state in each unit operation and, if the slope is detected to be equal to or greater than a predetermined slope threshold value, the particular current waveform detector may recognize occurrence of the particular current waveform. (A tenth configuration.)

In the driver device of the ninth configuration described above, the detection target period may include a first period and a second period occurring after the first period. The particular current waveform detector may set a reference slope based on one or more slopes detected as the slope during the first period and then, based on a comparison between the reference slope and the slope during the second period, the particular current waveform detector may detect occurrence of the particular current waveform during the second period. (An eleventh configuration.)

In the driver device of the eleventh configuration described above, in a case where an evaluation slope, which is the slope during the second period, is greater than the reference slope, if the absolute value of the difference between the reference slope and the evaluation slope is equal to or greater than a predetermined difference threshold value or if the ratio of the evaluation slope to the reference slope is equal to or greater than a predetermined ratio threshold value, the particular current waveform detector may recognize occurrence of the particular current waveform during the second period. (A twelfth configuration.)

In the driver device of any of the first to third configurations described above (the fourth embodiment; see FIG. 14), the output stage circuit may include a full-bridge circuit comprising four output transistors. Currents commensurate with the output current may flow through the output transistors respectively. The particular current waveform detector may acquire the current waveforms in the output transistors respectively based on the results (corresponding to the voltage drops across R1 [i] to R4[i]) of sensing of the currents flowing through the output transistors respectively. The particular current waveform detector may detect occurrence of the particular current waveform based on a comparison between the current waveforms in the output transistors and a predetermined current waveform (reference current waveform) during a detection target period in which the unit operation is repeated. (A thirteenth configuration.)

In the driver device of any of the first to third configurations described above (the fifth embodiment; see FIGS. 15 and 16), after the start of repetition of the unit operation, when the current setting signal is changed again to require that, according to the current setting signal changed again, the polarity of the output current be reversed from the target polarity (e.g., corresponding to time point $t_{B2}$ in FIG. 15 and corresponding to a switch from $I_{TG}[i]=I_{REF}$ to $I_{TG}[i]=-I_{REF}$), the control circuit may switch the output stage circuit from a first power supply state for feeding the coil with the output current of the target polarity to a second power supply state for feeding the coil with the output current of the polarity reversed from the target polarity. If the magnitude of the output current immediately after the switching is equal to or greater than a current threshold value ($I_{TH5}$) greater than the target magnitude ($I_{REF}$), the control circuit recognizes occurrence of the particular current waveform. (A fourteenth configuration.)

In the driver device of any of the first to fourteenth configurations described above, as the coil, a plurality of coils may be provided in the stepping motor. In the driver device, a plurality of channel circuits may be allocated to the plurality of coils respectively, and a plurality of the output stage circuits and a plurality of the control circuits may be provided for the channel circuits respectively. The rotor may rotate as a result of the output current being controlled in each of the channel circuits. (A fifteenth configuration.)

The invention claimed is:
1. A driver device for a stepping motor having a rotor and a coil, comprising:
   an output stage circuit configured to supply an output current to the coil by applying a voltage to the coil;
   a control circuit configured to control the output stage circuit based on
      a current setting signal for setting a target of the output current to be supplied to the coil and a current sense signal indicating a result of sensing of the output current; and a particular current waveform detector configured to detect occurrence of a particular current waveform in a waveform of the output current, wherein the rotor rotates according to change of the output current based on change of the current setting signal, when the current setting signal is changed to require that, according to the current setting signal changed, a polarity of the output current be set to a target polarity and a magnitude of the output current be set to a target magnitude, the control circuit changes the output current to a current having the target polarity and the target magnitude according to the current setting signal changed and then, to approximate the magnitude of the output current to the target magnitude, the control circuit repeatedly performs a unit operation which is a sequence of a power supply mode operation and a decay mode operation, in the power supply mode operation, the output stage circuit is in a power supply state in which the output stage circuit supplies electric power to the coil to increase the magnitude of the output current and, in the decay mode operation, the output stage circuit is in a decay state in which the output stage circuit suspends supplying the electric power to decrease the magnitude of the output current, after a start of repetition of the unit operation, the particular current waveform detector detects, as the particular current waveform, a waveform with which the magnitude of the output current increases above the target magnitude and, on detecting occurrence of the particular current waveform, the particular current waveform detector transmits a predetermined detection signal to a device external to the driver device.

2. The driver device according to claim 1, wherein during the repetition of the unit operation, the control circuit controls the output stage circuit so as to approximate the magnitude of the output current to the target magnitude such that the magnitude of the output current is equal to or smaller than the target magnitude, and the particular current waveform is a waveform with which the magnitude of the output current increases above the target magnitude against control by the control circuit due to a counter-electromotive force appearing in the coil as the rotor rotates.

3. The driver device according to claim 1, wherein in each unit operation, the control circuit performs the power supply mode operation at least for a predetermined forced power supply time and, if the magnitude of the output current is detected to be equal to or greater than the target magnitude when, after a start of the power supply mode operation, the forced power supply time has elapsed, the control circuit ends the power supply mode operation and performs the decay mode operation for a predetermined decay time.

4. The driver device according to claim 1, wherein the particular current waveform detector detects, as an output on time, a time during which, in each unit operation, the output stage circuit is in the power supply state and detects occurrence of the particular current waveform based on change of the output on time during a detection target period in which the unit operation is repeated.

5. The driver device according to claim 4, wherein the detection target period includes a first period and a second period occurring after the first period, and the particular current waveform detector sets a reference on time based on one or more output on times detected as the output on time during the first period and detects occurrence of the particular current waveform during the second period based on a comparison between the reference on time and the output on time during the second period.

6. The driver device according to claim 5, wherein in a case where an evaluation on time, which is the output on time during the second period, is shorter than the reference on time, if an absolute value of a difference between the reference on time and the evaluation on time is equal to or greater than a predetermined difference threshold value or if a ratio of the evaluation on time to the reference on time is equal to or smaller than a predetermined ratio threshold value, the particular current waveform detector recognizes occurrence of the particular current waveform during the second period.

7. The driver device according to claim 1, wherein during a detection target period in which the unit operation is repeated, the particular current waveform detector detects occurrence of the particular current waveform using a current threshold value greater than the target magnitude based on a comparison between the current threshold value and the magnitude of the output current.

8. The driver device according to claim 7, wherein the particular current waveform detector recognizes occurrence of the particular current waveform if, during the detection target period, the output current with a magnitude equal to or greater than the current threshold value is sensed.

9. The driver device according to claim 1, wherein the particular current waveform detector detects occurrence of the particular current waveform based on a slope of increase of the magnitude of the output current with the output stage circuit in the power supply state during a detection target period in which the unit operation is repeated.

10. The driver device according to claim 9, wherein during the detection target period, the particular current waveform detector detects a slope of increase of the magnitude of the output current with the output stage circuit in the power supply state in each unit operation and, if the slope is detected to be equal to or greater than a predetermined slope threshold value, the particular current waveform detector recognizes occurrence of the particular current waveform.

11. The driver device according to claim 9, wherein the detection target period includes a first period and a second period occurring after the first period, and the particular current waveform detector sets a reference slope based on one or more slopes detected as the slope during the first period and then, based on a comparison between the reference slope and the slope during the second period, the particular current waveform detector detects occurrence of the particular current waveform during the second period.

12. The driver device according to claim 11, wherein in a case where an evaluation slope, which is the slope during the second period, is greater than the reference slope, if an absolute value of a difference between the reference slope and the evaluation slope is equal to or greater than a predetermined difference threshold value or if a ratio of the evaluation slope to the reference slope is equal to or greater than a predetermined ratio threshold value, the particular current waveform detector recognizes occurrence of the particular current waveform during the second period.

13. The driver device according to claim 1, wherein
the output stage circuit includes a full-bridge circuit comprising four output transistors,
currents commensurate with the output current flow through the output transistors respectively, and
the particular current waveform detector acquires current waveforms in the output transistors respectively based on results of sensing of the currents flowing through the output transistors respectively, and the particular current waveform detector detects occurrence of the particular current waveform based on a comparison between the current waveforms in the output transistors and a predetermined current waveform during a detection target period in which the unit operation is repeated.

14. The driver device according to claim 1, wherein
after a start of repetition of the unit operation, when the current setting signal is changed again to require that, according to the current setting signal changed again, the polarity of the output current be reversed from the target polarity, the control circuit switches the output stage circuit from a first power supply state for feeding the coil with the output current of the target polarity to a second power supply state for feeding the coil with the output current of the polarity reversed from the target polarity and, if the magnitude of the output current immediately after the switching is equal to or greater than a current threshold value greater than the target magnitude, the control circuit recognizes occurrence of the particular current waveform.

15. The driver device according to claim 1, wherein
as the coil, a plurality of coils are provided in the stepping motor,
in the driver device, a plurality of channel circuits are allocated to the plurality of coils respectively, and a plurality of the output stage circuits and a plurality of the control circuits are provided for the channel circuits respectively, and
as a result of the output current being controlled in each of the channel circuits, the rotor rotates.

* * * * *